United States Patent
Tsurumi

(10) Patent No.: US 12,103,663 B2
(45) Date of Patent: Oct. 1, 2024

(54) CONTROL DEVICE, CONTROL METHOD, UNMANNED AIRCRAFT, INFORMATION PROCESSING DEVICE, AND INFORMATION PROCESSING METHOD

(71) Applicant: SONY GROUP CORPORATION, Tokyo (JP)

(72) Inventor: Shingo Tsurumi, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 45 days.

(21) Appl. No.: 17/635,854

(22) PCT Filed: Aug. 12, 2020

(86) PCT No.: PCT/JP2020/030644
§ 371 (c)(1),
(2) Date: Feb. 16, 2022

(87) PCT Pub. No.: WO2021/039387
PCT Pub. Date: Mar. 4, 2021

(65) Prior Publication Data
US 2022/0297821 A1 Sep. 22, 2022

(30) Foreign Application Priority Data

Aug. 26, 2019 (JP) ................... 2019-153895

(51) Int. Cl.
*B64C 13/20* (2006.01)
*B64C 39/02* (2023.01)
(Continued)

(52) U.S. Cl.
CPC .............. *B64C 13/20* (2013.01); *B64D 25/00* (2013.01); *B64D 47/08* (2013.01); *G05D 1/0016* (2013.01);
(Continued)

(58) Field of Classification Search
CPC ........ B64C 13/20; B64C 39/024; B64D 25/00; B64D 47/08; G05D 1/0016; G05D 1/0038;
(Continued)

(56) References Cited

U.S. PATENT DOCUMENTS

| | | | |
|---|---|---|---|
| 2010/0084513 A1 | 4/2010 | Gariepy et al. | |
| 2017/0106976 A1* | 4/2017 | Kuhara | G08G 5/0069 |

(Continued)

FOREIGN PATENT DOCUMENTS

| | | | | |
|---|---|---|---|---|
| JP | 2018-044913 A | 3/2018 | | |
| WO | 2017/033976 A1 | 3/2017 | | |
| WO | 20170086194 A | * 7/2017 | ........... B64C 39/024 |

OTHER PUBLICATIONS

Machine Translation KR 20170086194 (Year: 2017).*

(Continued)

*Primary Examiner* — Anne Marie Antonucci
*Assistant Examiner* — Jodi Marie Jones
(74) *Attorney, Agent, or Firm* — CHIP LAW GROUP

(57) ABSTRACT

The present technology relates to a control device, a control method, an unmanned aircraft, an information processing device, an information processing method, and a program capable of reflecting the user's intentions and reducing damage in the event of a failure in an unmanned aircraft. A control device of a first aspect of the present technology is a device that controls movement of an unmanned aircraft during a fall according to a control command generated for an image showing a falling position, captured by the unmanned aircraft. The present technology can be applied to a device that controls a drone that controls movement so as to shift the falling position when an aircraft fails.

15 Claims, 31 Drawing Sheets

(51) Int. Cl.
*B64D 25/00* (2006.01)
*B64D 47/08* (2006.01)
*B64U 101/30* (2023.01)
*G05D 1/00* (2024.01)
*G08G 5/00* (2006.01)
*H04W 4/38* (2018.01)

(52) U.S. Cl.
CPC .......... *G05D 1/0038* (2013.01); *G08G 5/0026* (2013.01); *G08G 5/0069* (2013.01); *H04W 4/38* (2018.02); *B64C 39/024* (2013.01); *B64U 2101/30* (2023.01); *B64U 2201/20* (2023.01)

(58) Field of Classification Search
CPC ..... G08G 5/0026; G08G 5/0069; H04W 4/38; B64U 2101/30; B64U 2201/20; B64U 70/00; B64U 2201/10
USPC .... 701/2, 3, 120, 301, 23, 4, 14, 16, 11, 36, 701/1, 28, 117, 24, 300, 15, 26, 25, 408, 701/8, 10, 13, 9, 528, 31.4, 17, 7, 532, 701/22, 400, 467, 5, 50, 33.4, 469, 122, 701/468, 302, 45, 514, 41, 70, 18, 517, 701/121, 410, 431, 29.3, 465, 411, 482, 701/49, 21, 27, 32.3, 423, 701, 519, 533, 701/29.1, 34.4, 500, 412, 124, 409, 422, 701/48, 487, 31.5, 416, 418, 472, 484, 701/523, 118, 123, 33.2, 439, 448, 46, 701/470, 483, 486, 525, 540, 66, 99, 101, 701/103, 30.3, 32.8, 33.1, 425, 435, 445, 701/454, 466, 494, 538, 100, 102, 105, 701/116, 19, 20, 29.2, 29.4, 29.6, 29.7, 701/30.2, 32.4, 33.9, 34.2, 414, 42, 436, 701/461, 47, 471, 474, 476, 485, 508, 701/513, 516, 522, 527, 530, 531, 537, 701/96, 31.9, 32.7, 34.3, 37, 415, 424, 701/434, 438, 446, 491, 492, 6, 87
See application file for complete search history.

(56) References Cited

U.S. PATENT DOCUMENTS

2017/0308088 A1* 10/2017 Sabe .................... G01C 11/025
2018/0081056 A1 3/2018 Ohtomo et al.

OTHER PUBLICATIONS

International Search Report and Written Opinion of PCT Application No. PCT/JP2020/030644, issued on Oct. 27, 2020, 09 pages of ISRWO.

* cited by examiner

CONTROL DEVICE, CONTROL METHOD, UNMANNED AIRCRAFT, INFORMATION PROCESSING DEVICE, AND INFORMATION PROCESSING METHOD

CROSS REFERENCE TO RELATED APPLICATIONS

This application is a U.S. National Phase of International Patent Application No. PCT/JP2020/030644 filed on Aug. 12, 2020, which claims priority benefit of Japanese Patent Application No. JP 2019-153895 filed in the Japan Patent Office on Aug. 26, 2019. Each of the above-referenced applications is hereby incorporated herein by reference in its entirety.

TECHNICAL FIELD

The present technology particularly relates to a control device, a control method, an unmanned aircraft, an information processing device, an information processing method, and a program capable of reflecting the user's intentions and reducing damage in the event of a failure in an unmanned aircraft.

BACKGROUND ART

In recent years, a small unmanned aircraft called a drone, which can be remotely controlled, has been attracting attention. If an unmanned aircraft fails during flight and becomes uncontrollable, it may fall and lead to a major accident. Therefore, various technologies for reducing damage in the event of a failure have been proposed.

For example, PTL 1 proposes a technique for estimating a fall range and detecting a person on the basis of an image obtained by photographing the lower part of the aircraft, and controlling the aircraft so that the position of the person and the fall range do not overlap.

CITATION LIST

Patent Literature

[PTL 1]
WO 2017/033976

SUMMARY

Technical Problem

In the technique disclosed in PTL 1, it is necessary to determine the detection target in advance. Further, since the control of the aircraft is entrusted to the self-sustaining control, it is not possible to reflect the values of the user who operates the unmanned aircraft and the intention of the user according to the situation.

The present technology has been made in view of such a situation, and reflects the intention of the user so that the damage in the event of a failure of the unmanned aircraft can be reduced.

Solution to Problem

A control device according to a first aspect of the present technology includes a control unit that controls movement of an unmanned aircraft during a fall according to a control command generated for an image showing a falling position, captured by the unmanned aircraft.

An unmanned aircraft according to a second aspect of the present technology includes: an imaging unit that captures a surrounding situation; and a control unit that controls movement of an unmanned aircraft during a fall according to a control command generated for an image showing a falling position, captured by the imaging unit.

An information processing device according to a third aspect of the present technology includes: a display control unit that displays an image showing a falling position, captured by an unmanned aircraft; a generation unit that generates a control command used for controlling the movement of the unmanned aircraft with respect to the image; and a transmitting unit that transmits the control command to the unmanned aircraft.

In the first aspect of the present technology, the movement of an unmanned aircraft during a fall is controlled according to a control command generated for an image showing a falling position, captured by the unmanned aircraft.

In the second aspect of the present technology, a surrounding situation is captured, and the movement of an unmanned aircraft during a fall is controlled according to a control command generated for an image showing a falling position.

In the third aspect of the present technology, an image showing a falling position, captured by an unmanned aircraft is displayed, a control command used for controlling the movement of the unmanned aircraft with respect to the image is generated, and the control command is transmitted to the unmanned aircraft.

DESCRIPTION OF EMBODIMENTS

Figure 1:
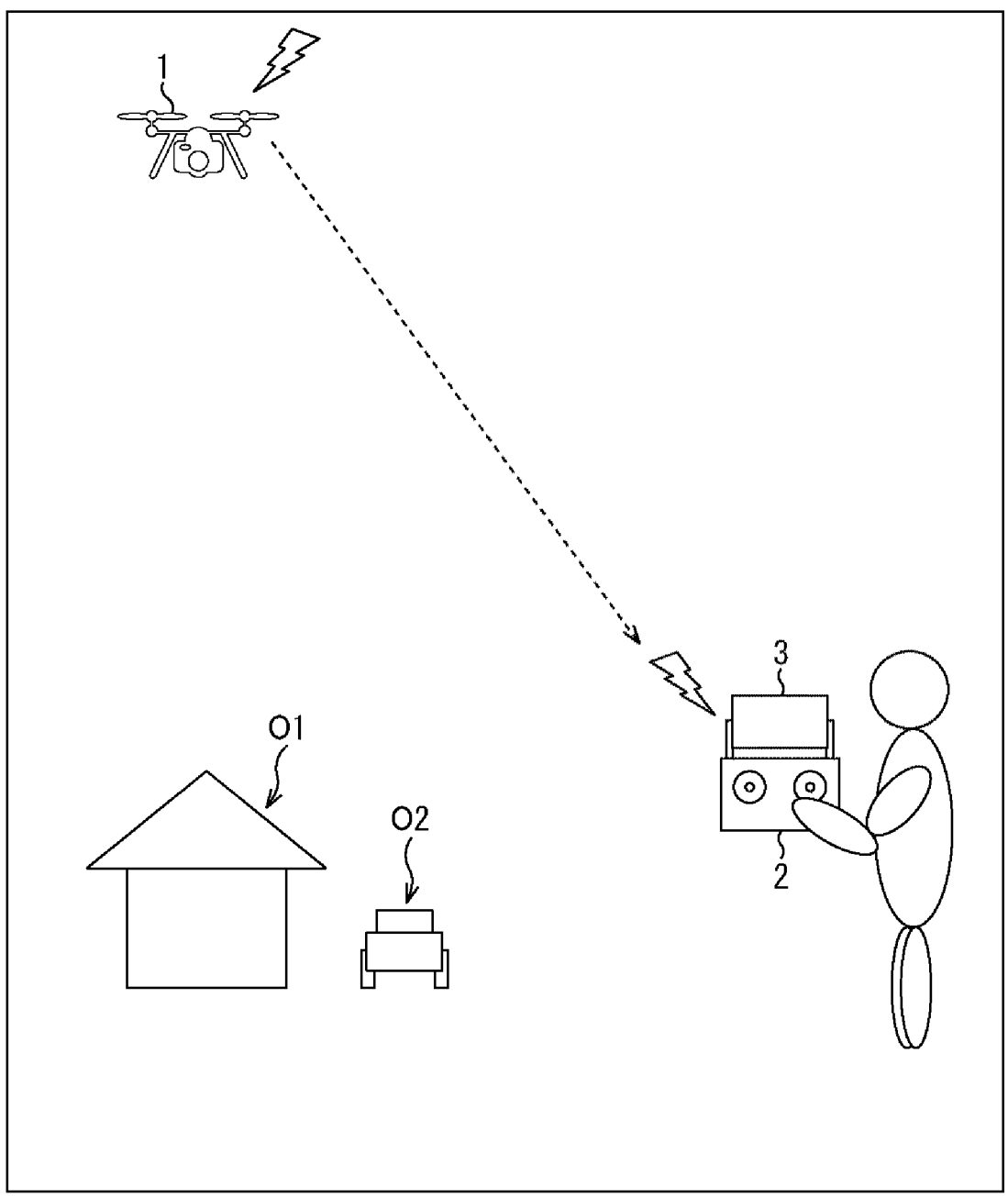
FIG. 1 is a diagram showing a configuration example of a control system according to an embodiment of the present technology.

Hereinafter, embodiments of the present technology will be described. Note that the description will be given in the following order.
1. Example of first control of unmanned aircraft
2. Configuration of each device
3. Operation of each device
4. Example of second control of unmanned aircraft
5. Example of third control of unmanned aircraft
6. Example of fourth control of unmanned aircraft
7. Modification <Example of First Control of Unmanned Aircraft>

FIG. 1 is a diagram showing a configuration example of a control system according to an embodiment of the present technology.

The control system of FIG. 1 includes an unmanned aircraft 1 and a controller 2.

The unmanned aircraft 1 is a so-called drone, and moves (flies) according to a signal from the controller 2. The unmanned aircraft 1 may be an autonomously moving aircraft. In FIG. 1, the unmanned aircraft 1 is moving over a house O1 and a car O2 parked next to the house O1.

The unmanned aircraft 1 is an aircraft equipped with a camera. The image captured while the unmanned aircraft 1 is moving is transmitted to the controller 2 by wireless communication as indicated by a broken line arrow.

The image transmitted from the unmanned aircraft 1 may be a moving image or a still image. Images may be transmitted by wired communication instead of wireless communication.

The controller 2, which is the transmitter of the unmanned aircraft 1, receives the image transmitted from the unmanned aircraft 1 and displays the same on a smartphone 3. In the example of FIG. 1, the controller 2 is a device that uses the display of the smartphone 3 attached to the housing of the controller 2 as the display destination of the image captured by the camera of the unmanned aircraft 1.

In this way, the user can operate the controller 2 while looking at the image displayed on the smartphone 3 and control the unmanned aircraft 1 even when the unmanned aircraft 1 is moving away from the user.

By the way, an accident such as a propeller coming off or a motor failure may occur. In this case, the unmanned aircraft 1 will fall.

In the control system of FIG. 1, imaging is continued even while the unmanned aircraft 1 is falling, and the image during the fall is presented to the user. The user can control the movement of the unmanned aircraft 1 by looking at the image during the fall.

Figure 2:
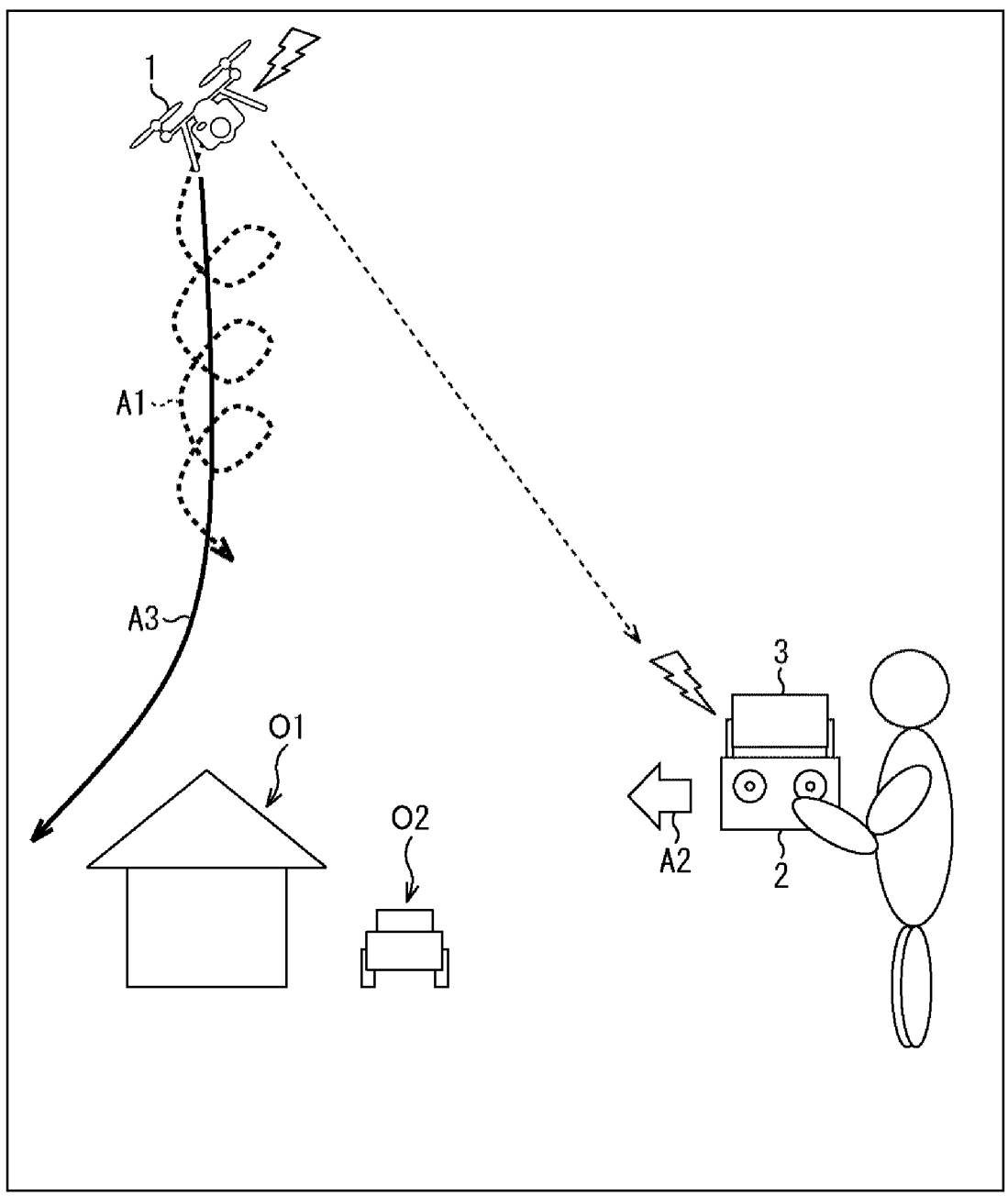
FIG. 2 is a diagram showing a state at the time of falling.

FIG. 2 is a diagram showing a state at the time of falling.

When a part of the aircraft fails, the unmanned aircraft 1 falls while rotating, for example, as indicated by a dotted arrow A1.

At the time of falling, the unmanned aircraft 1 synthesizes information indicating the falling position with the image captured by the camera, and transmits a composite image to the controller 2.

The smartphone 3 attached to the controller 2 displays the composite image transmitted from the unmanned aircraft 1.

Since the information indicating the falling position is displayed, the user can move the unmanned aircraft 1 in the direction of avoiding the house O1 and the car O2 while looking at the composite image displayed on the smartphone 3. In the example of FIG. 2, the unmanned aircraft 1 avoids the house O1 and the car O2 as indicated by a solid arrow A3 in response to the user performing an operation such as moving the unmanned aircraft 1 in the direction indicated by a blank arrow A2.

Figure 3:
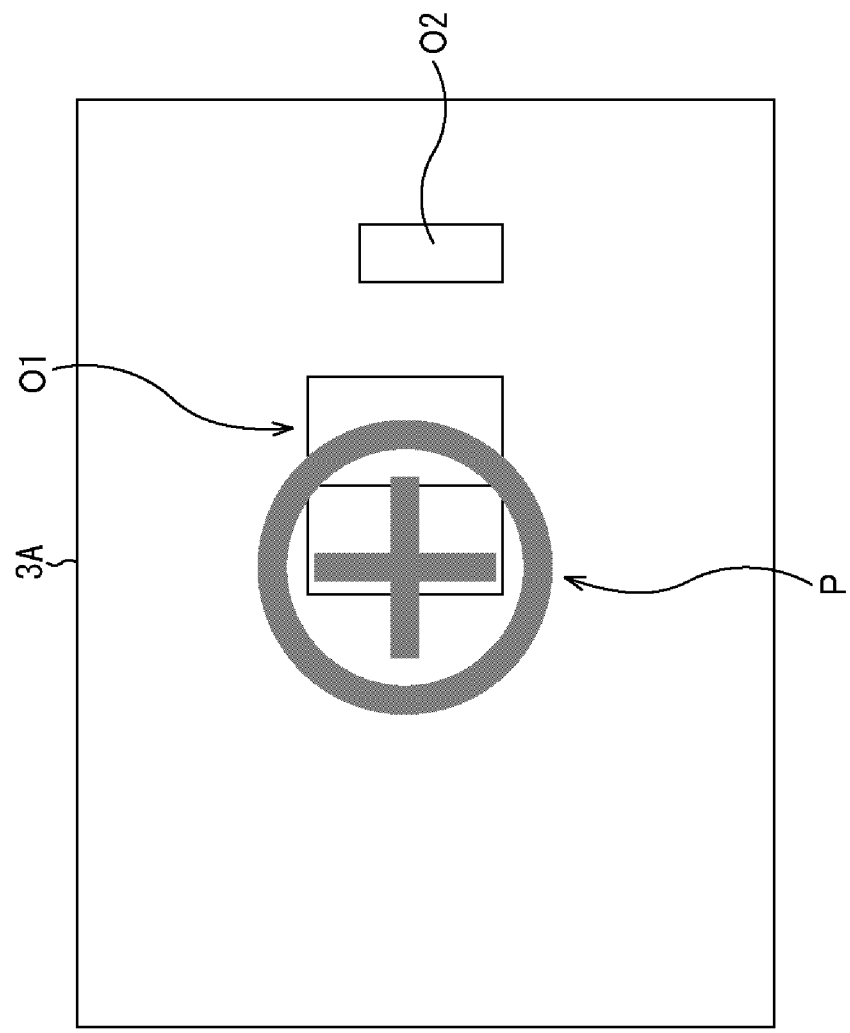
FIG. 3 is a diagram showing a display example of a composite image.

FIG. 3 is a diagram showing a display example of a composite image.

As shown in FIG. 3, the display 3A of the smartphone 3 displays a composite image showing the falling position of the unmanned aircraft 1. The falling position of the unmanned aircraft 1 is an estimated position in consideration of surrounding environmental information such as wind speed.

For example, the falling position of the unmanned aircraft 1 is represented by a falling position image P. In the example of FIG. 3, the falling position image P is an image in which a cross is arranged in a circle. The center of the cross that constitutes the falling position image P represents the falling position. The falling position may be represented by a point or a region.

In the example of FIG. 3, the falling position is the position on the house O1. The car O2 is on the right side of the house O1. If the unmanned aircraft 1 falls as it is, the unmanned aircraft 1 will collide with the house O1.

Since the falling position and an object such as the house O1 are displayed, the user can indicate the direction of movement of the unmanned aircraft 1 in the direction of avoiding the object with which the unmanned aircraft is expected to collide or the direction in which damage is reduced even if the unmanned aircraft 1 collides with the object while looking at the composite image. In the example of FIG. 3, the left direction on the composite image is the direction in which the object is considered to be avoided or the damage is reduced.

Figure 4:
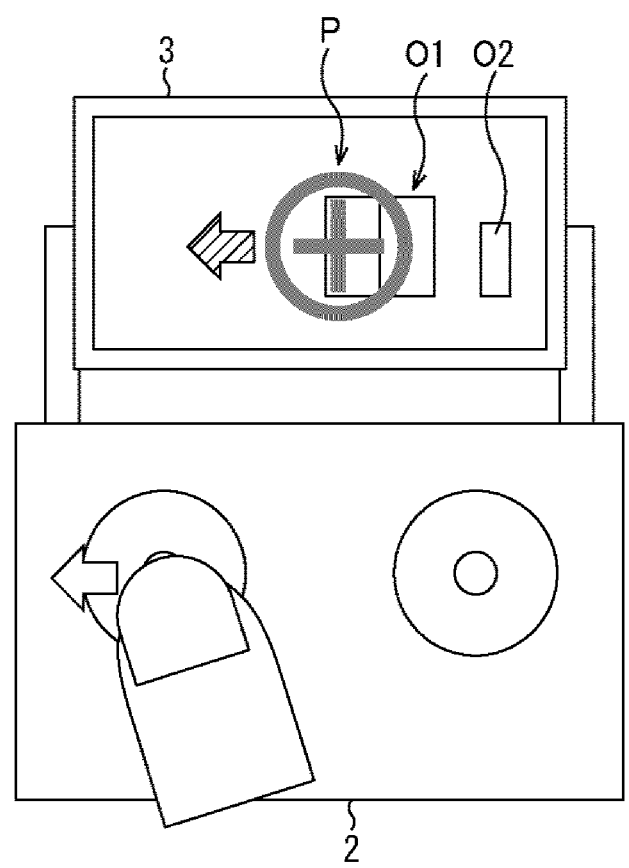
FIG. 4 is a diagram showing an example of user operation.

FIG. 4 is a diagram showing an example of user operation.

By looking at the display of the composite image, as shown in FIG. 4, the user tilts the stick of the controller 2 to the left and instructs the left direction in the composite image, that is, the direction of avoiding the house O1 and the car O2 as the movement direction. In FIG. 4, the hatched arrow on the composite image shown indicates the direction in which the unmanned aircraft 1 is desired to be moved, and is not an image displayed superimposed on the composite image.

The image captured by the unmanned aircraft 1 at the time of falling is an image in which the imaging range keeps changing at a high speed. For this reason, it is difficult for the user to confirm the position where the unmanned aircraft 1 may fall or the object with which the unmanned aircraft 1 may collide just by looking at the captured image.

By displaying the composite image in which the falling position image P is displayed, the user can allow the unmanned aircraft 1 to fall at a position where the damage at the time of the fall is considered to be reduced according to the user's values and the situation at the time of the fall.

In addition, it is possible to avoid a collision with an object that is difficult to detect by object detection or the like.

The user can designate the direction in which the unmanned aircraft 1 is moved with reference to the direction in the composite image during the fall of the unmanned aircraft 1. The direction designated by the user is converted into a direction in the coordinate system of the unmanned aircraft 1 according to the attitude of the unmanned aircraft 1 at that time, and the moving direction is controlled.

Figure 5:
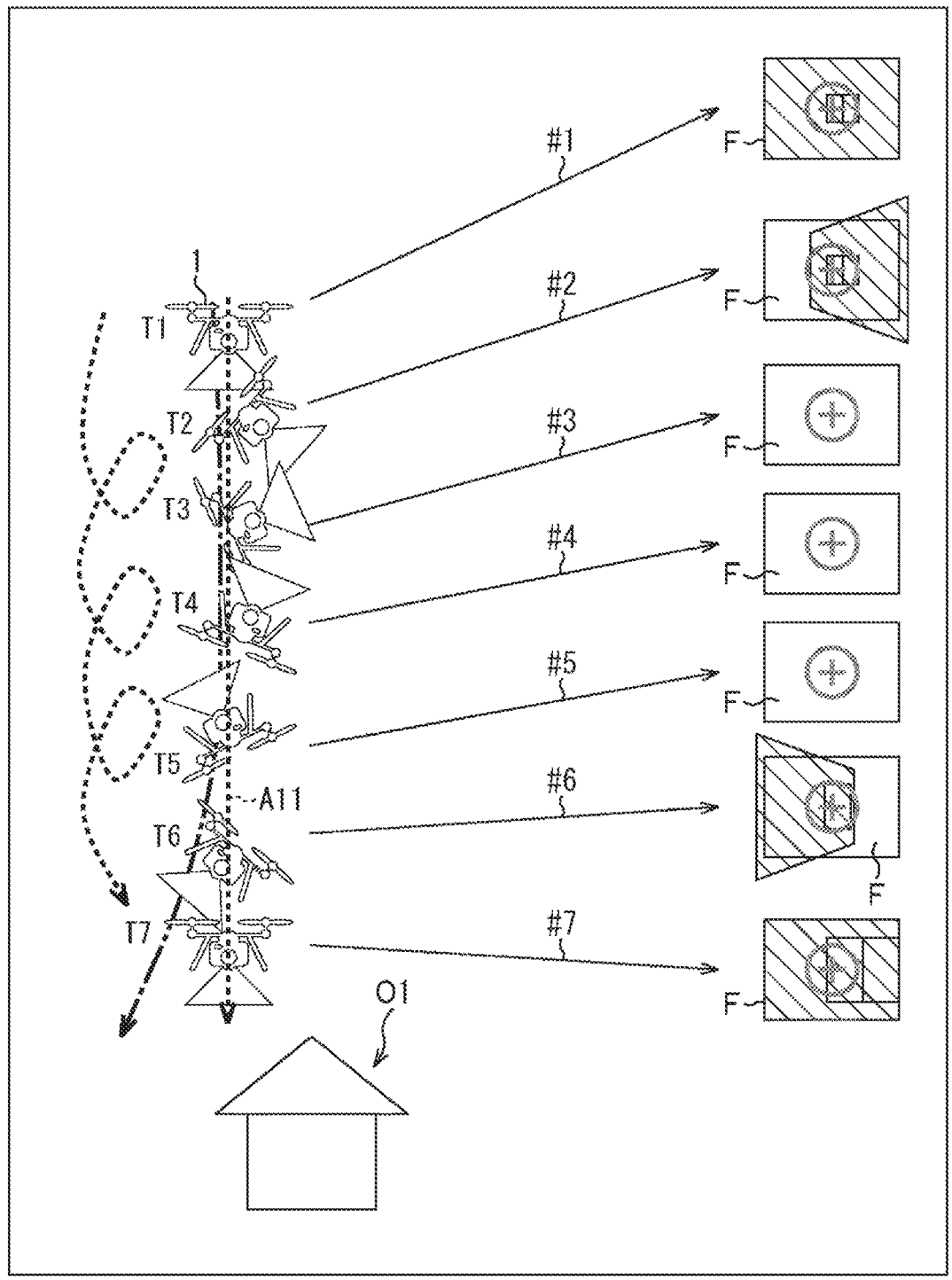
FIG. 5 is a diagram showing a relationship between an image captured by an unmanned aircraft and a composite image displayed on a smartphone.

FIG. 5 is a diagram showing the relationship between the image captured by the unmanned aircraft 1 and the composite image displayed on the smartphone 3.

As shown on the left side of FIG. 5, when a failure occurs in the aircraft, the unmanned aircraft 1 falls while rotating. FIG. 5 shows the state of the unmanned aircraft 1 at each time of times T1 to T7. A dotted arrow A11 indicating the direction directly below indicates the falling direction when there is no user operation.

Blank triangles shown on the bottom surface side of the unmanned aircraft 1 represent the angle of view of the camera provided on the unmanned aircraft 1. For example, the direction of the angle of view of the camera at time T1 is the direction directly below.

In this case, as shown at the tip of arrow #1, the angle of view of the camera overlaps with the display range of the composite image as a whole.

A rectangular frame F shown on the right side of FIG. 5 represents the display range of the composite image (the range displayed on the display 3A). The display range of the composite image is set so that, for example, the falling position is at the center. The hatched range represents the range of the angle of view of the camera.

At time T1, the composite image is displayed using the image captured by the unmanned aircraft 1 as it is.

The direction of the angle of view of the camera at time T2 is diagonally downward to the right. In this case, as shown at the tip of arrow #2, the angle of view of the camera partially overlaps with the display range of the composite image.

At time T2, the composite image is displayed using a part of the image captured by the unmanned aircraft 1 that overlaps with the display range of the composite image. Of the entire composite image, a range other than the range displayed using the image captured at time T2 is displayed using, for example, the images captured at times before time T2.

The direction of the angle of view of the camera at time T3 is diagonally upward to the right. In this case, as shown at the tip of arrow #3, the angle of view of the camera does not overlap with the display range of the composite image.

At time T3, the composite image is displayed using the images captured at times before time T3.

If the angle of view of the camera and the display range of the composite image do not match, the composite image may not be displayed.

The angles of view of the camera at times T4 and T5 do not overlap with the display range of the composite image, as shown at the tip of each of arrows #4 and #5, like the angle of view of the camera at time T3.

At times T4 and T5, the composite image is displayed using the images captured at the times before the times T4 and T5, respectively.

The angle of view of the camera at time T6 partially overlaps with the display range of the composite image, as shown at the tip of arrow #6.

At time T6, the composite image is displayed using a part of the image captured by the unmanned aircraft 1 that overlaps with the display range of the composite image.

The angle of view of the camera at time T7 overlaps with the display range of the composite image as a whole, as shown at the tip of arrow #7.

At time T7, the composite image is displayed using the image captured by the unmanned aircraft 1 as it is.

In this way, the display 3A of the smartphone 3 viewed by the user continues to display only the range including the falling position among the images captured during the fall. In this way, the user can instruct the moving direction of the unmanned aircraft 1 while looking at the composite image showing the falling position even when the unmanned aircraft 1 is falling while rotating.

In the above, it is assumed that the controller 2 is a controller in which the smartphone 3 is attached, but it may be a controller in another form.

Figure 6A:
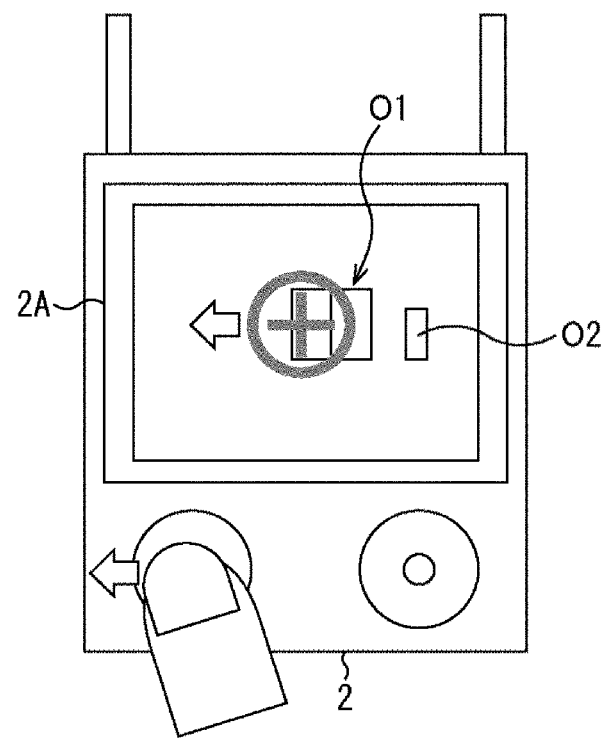
FIGS. 6A and 6B are diagrams showing another configuration example of a controller.
Figure 6B:
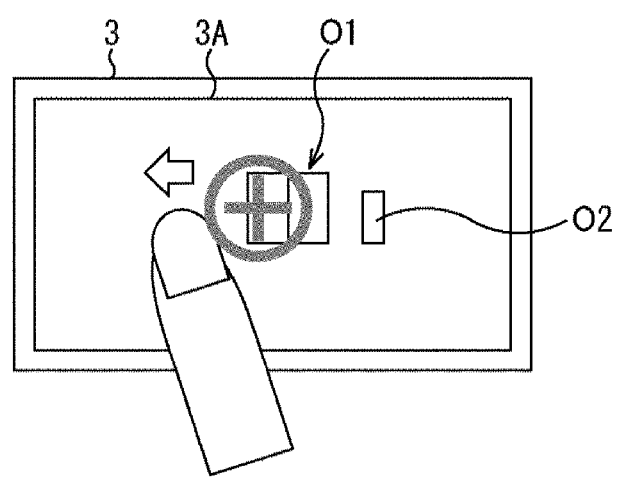

FIGS. 6A and 6B are diagrams showing another configuration example of the controller 2.

The controller 2 shown in FIG. 6A is a controller in which a display 2A is provided in a housing. The user can steer the unmanned aircraft 1 by looking at the composite image displayed on the display 2A and the like. For example, the direction of movement is indicated by the direction in which the user tilts the stick, and the amount of movement is indicated by the amount of tilting the stick.

As shown in FIG. 6B, the smartphone 3 itself can be used as a transmitter. The user can steer the unmanned aircraft 1 by performing a swipe operation or the like by looking at the composite image displayed on the display 3A or the like.

<Configuration of Each Device>

Configuration of Unmanned Aircraft 1

Figure 7:
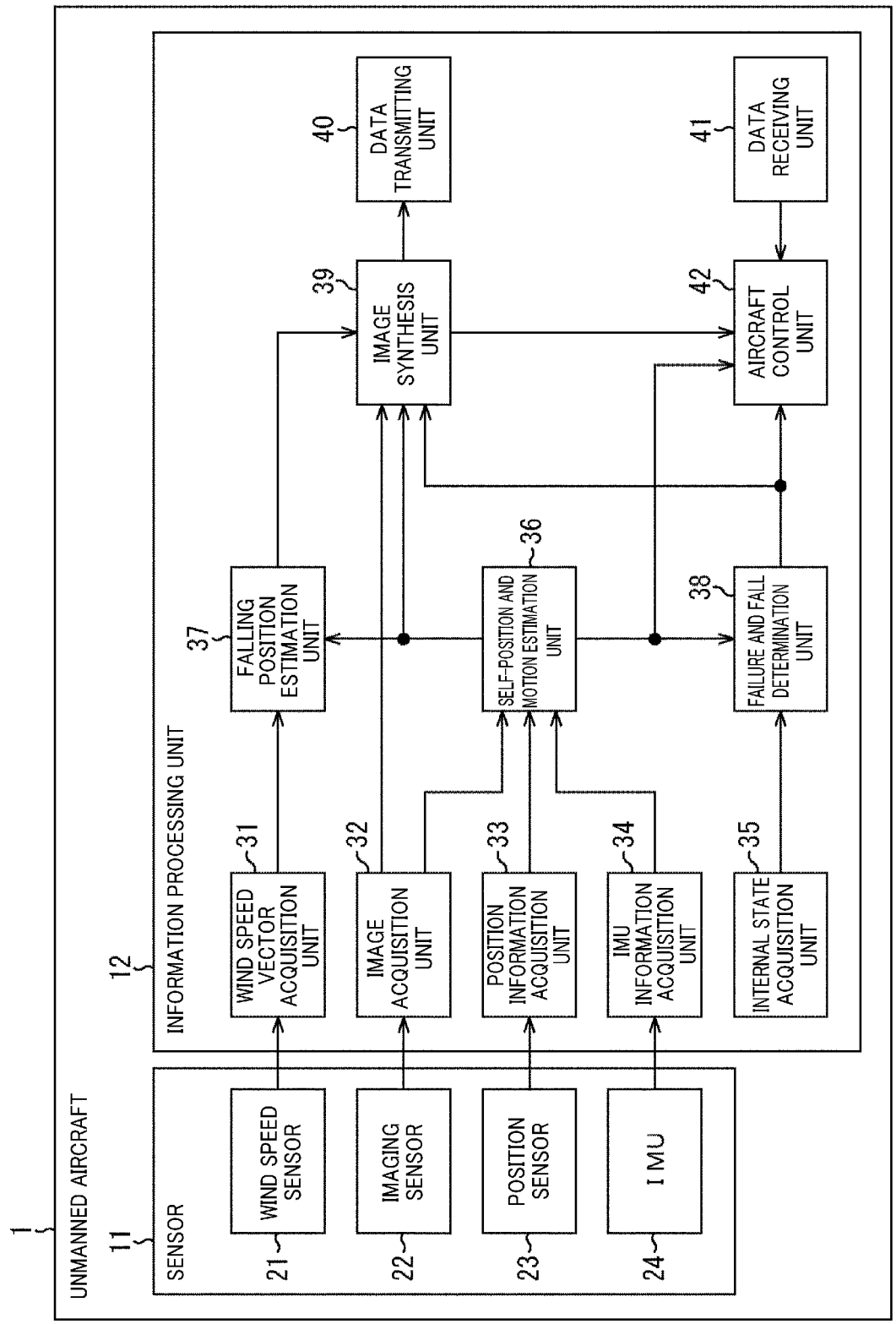
FIG. 7 is a block diagram showing a configuration example of an unmanned aircraft.

FIG. 7 is a block diagram showing a configuration example of the unmanned aircraft 1.

As shown in FIG. 7, the unmanned aircraft 1 includes a sensor 11 and an information processing unit 12.

The sensor 11 includes a wind speed sensor 21, an imaging sensor 22, a position sensor 23, and an IMU (Inertial Measurement Unit) 24. The imaging sensor 22 is provided in the camera mounted on the unmanned aircraft 1.

The wind speed sensor 21 detects and outputs a wind speed vector including a wind direction and a wind speed (air volume).

The imaging sensor 22 is configured of an image sensor, a stereo camera, a ToF (Time of Flight) sensor, a LiDER (Light Detection and Ranging, Laser Imaging Detection and Ranging), and the like.

The image sensor constituting the imaging sensor 22 images the surrounding situation and outputs image data.

Further, for example, a stereo camera constituting the imaging sensor 22 calculates the distance to each object captured in the image on the basis of the image obtained by imaging, and outputs the distance information. The distance to the object may be detected by a ToF sensor or the like.

The position sensor 23 is configured of a GPS (Global Positioning System) sensor, a barometer, and the like. The position sensor 23 receives radio waves from the satellite, performs positioning, and outputs position information of the unmanned aircraft 1.

The IMU 24 includes an acceleration sensor, a gyro sensor, a magnetic sensor, and the like. The IMU 24 measures the speed, acceleration, magnetic field strength, and the like of the unmanned aircraft 1 and outputs it as IMU information.

The information processing unit 12 includes a wind speed vector acquisition unit 31, an image acquisition unit 32, a position information acquisition unit 33, an IMU information acquisition unit 34, an internal state acquisition unit 35, a self-position and motion estimation unit 36, a falling position estimation unit 37, and a failure and fall determination unit 38, an image synthesis unit 39, a data transmitting unit 40, a data receiving unit 41, and an aircraft control unit 42.

The wind speed vector acquisition unit 31 acquires the wind speed vector output from the wind speed sensor 21, and outputs the wind speed information representing the acquired wind speed vector to the falling position estimation unit 37.

The image acquisition unit 32 acquires the image data and the distance information output from the imaging sensor 22, and outputs the same to the self-position and motion estimation unit 36. The image acquisition unit 32 outputs the image data to the image synthesis unit 39.

The position information acquisition unit 33 acquires the position information output from the position sensor 23 and outputs the same to the self-position and motion estimation unit 36.

The IMU information acquisition unit 34 acquires the IMU information output from the IMU 24 and outputs the same to the self-position and motion estimation unit 36.

The internal state acquisition unit 35 acquires the output values of a current monitor, a voltage monitor, an encoder, and the like of the unmanned aircraft 1 as information indicating the internal state, and outputs the output values to the failure and fall determination unit 38.

The self-position and motion estimation unit 36 calculates the flight state of the unmanned aircraft 1 on the basis of the image data and distance information supplied from the image acquisition unit 32, the position information supplied from the position information acquisition unit 33, and the IMU information supplied from the IMU information acquisition unit 34. The flight state includes the position, attitude, speed, angular velocity, acceleration, angular acceleration, and the like of the aircraft of the unmanned aircraft 1.

The self-position and motion estimation unit 36 estimates the inertial force and gravity applied to the unmanned aircraft 1 on the basis of the flight state.

The self-position and motion estimation unit 36 outputs information representing the flight state and the inertial force and gravity applied to the unmanned aircraft 1 as the self-position and motion estimation result. The self-position and motion estimation result output from the self-position and motion estimation unit 36 is supplied to the falling position estimation unit 37, the failure and fall determination unit 38, the image synthesis unit 39, and the aircraft control unit 42.

The falling position estimation unit 37 estimates the falling position of the falling unmanned aircraft 1 on the basis of the wind speed information supplied from the wind speed vector acquisition unit 31 and the self-position and motion estimation result supplied from the self-position and motion estimation unit 36.

Figure 8:
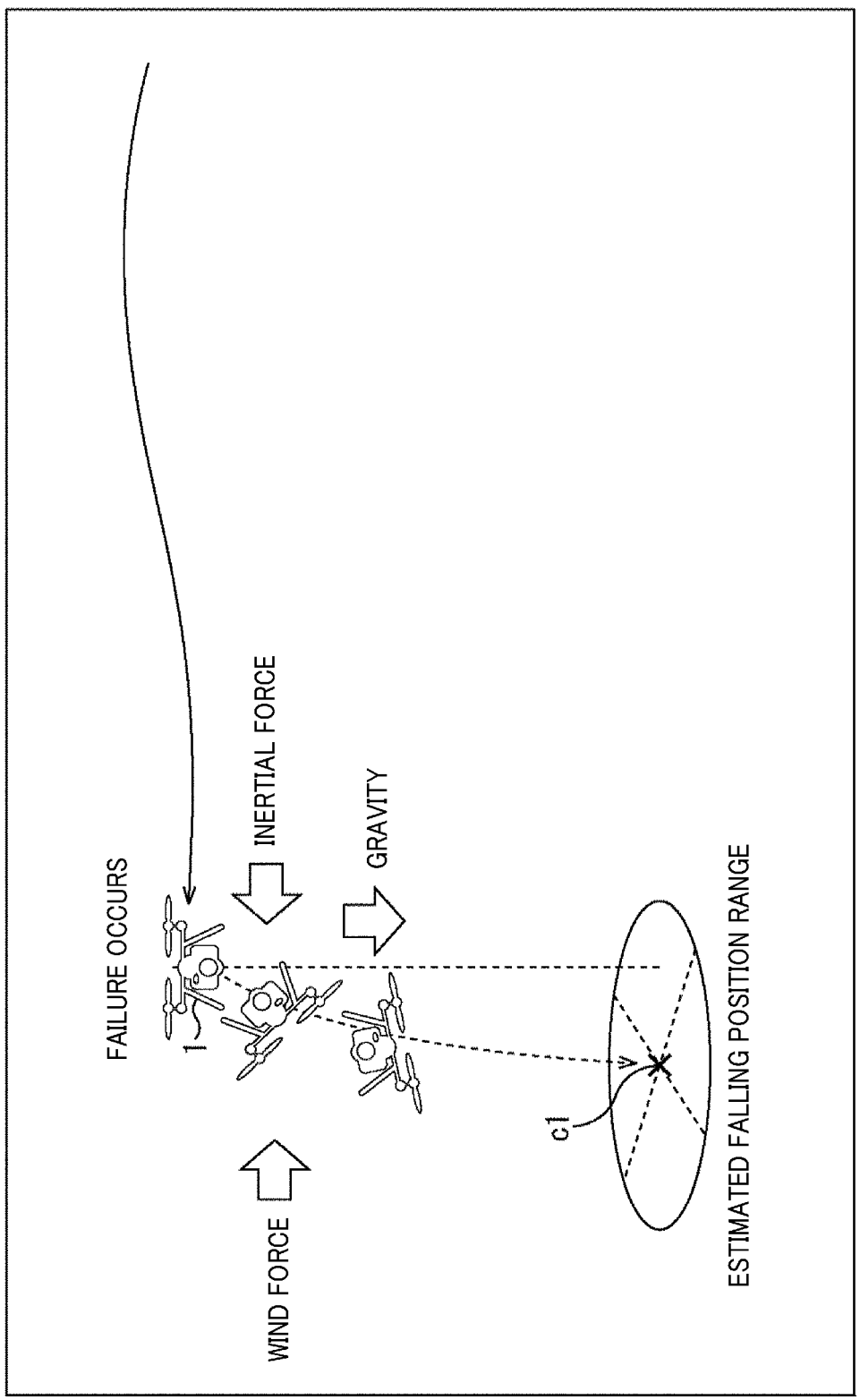
FIG. 8 is a diagram showing an example of a method of estimating a falling position.

FIG. 8 is a diagram showing an example of a method of estimating the falling position.

As indicated by blank arrows in FIG. 8, an inertial force in a direction corresponding to the moving direction up to that point is applied to the unmanned aircraft 1 that has failed during flight, and a downward gravity is applied. In addition, wind force corresponding to the wind direction is applied. The inertial force, gravity, and wind force applied to an unmanned aircraft are collectively referred to as external force.

The falling position estimation unit 37 estimates the falling position on the basis of the flight state and the external force. In FIG. 8, the position C1 which is a position deviated from directly below the position where the failure occurred is estimated as the falling position.

The falling position estimation unit 37 sets a region having a predetermined shape centered on the estimated falling position as the estimated falling position range. The estimated falling position range is set as a region that gradually narrows as the unmanned aircraft 1 approaches the ground.

Returning to the description of FIG. 7, the falling position estimation unit 37 outputs the falling position estimation result representing the estimated falling position and the estimated falling position range to the image synthesis unit 39.

The failure and fall determination unit 38 determines the failure or fall of the aircraft of the unmanned aircraft 1 on the basis of the information representing the internal state supplied from the internal state acquisition unit 35 and the self-position and motion estimation result supplied from the self-position and motion estimation unit 36.

Specifically, the failure and fall determination unit 38 diagnoses a failure such as a failure of the motor of the unmanned aircraft 1, damage to the propeller, and wrapping of a foreign object using the internal state. The failure and fall determination unit 38 diagnoses a failure on the basis of the amount of deviation between the actual internal state and the internal state assumed when there is no failure.

In this way, the failure and fall determination unit 38 detects that a failure that hinders the movement has occurred and the unmanned aircraft 1 cannot move as expected and begins to fall. For the determination of failure and fall, a rule-based determination may be performed, or a model obtained by machine learning may be used.

The failure and fall determination unit 38 outputs the failure and fall determination information to the image synthesis unit 39 and the aircraft control unit 42. The failure and fall determination information includes, for example, information indicating whether a failure has occurred and information indicating a failed portion of the unmanned aircraft 1.

The image synthesis unit 39 generates a composite image by synthesizing the falling position image with the image in which the falling position is captured. For the generation of the composite image, the image data supplied from the image acquisition unit 32, the self-position and motion estimation result supplied from the self-position and motion estimation unit 36, the falling position estimation result supplied from the falling position estimation unit 37, and the failure and fall determination information supplied from the failure and fall determination unit 38 are used.

Figure 9:
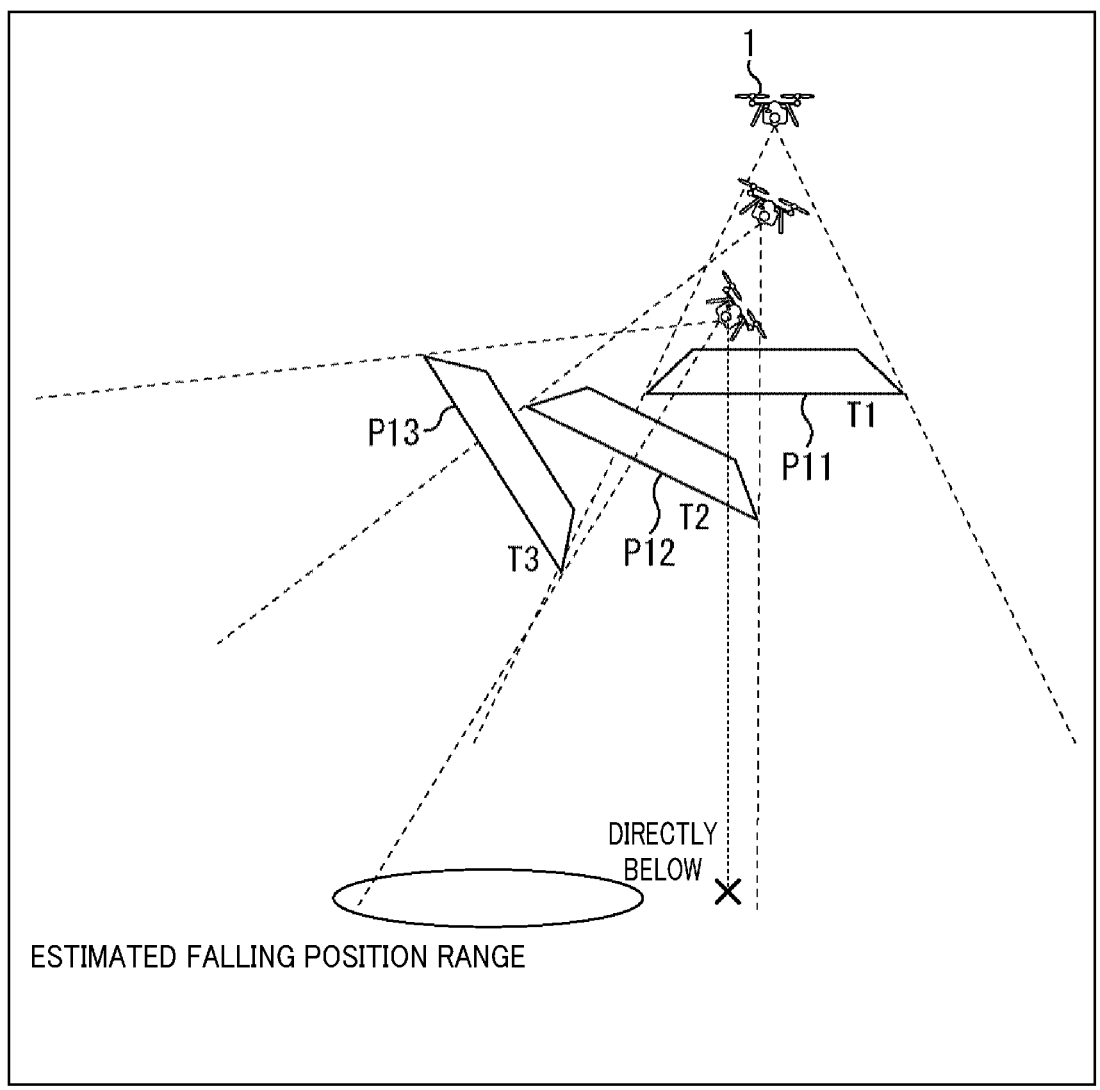
FIG. 9 is a diagram showing an example of images used for generating a composite image.

FIG. 9 is a diagram showing an example of images used for generating a composite image.

FIG. 9 shows the state of the unmanned aircraft 1 at each time of times T1 to T3. Here, it is assumed that the unmanned aircraft 1 is provided with one camera. The range indicated by a broken line represents the range of the angle of view of the camera at each time.

At times T1 to T3, images are captured in a state where the camera is directed downward, diagonally downward to the left, and further to the left than the direction at time T2, respectively, and the captured images P11 to P13 having the angles of view indicated by the trapezoids in FIG. 9 are acquired.

For example, at time T3, a composite image is generated on the basis of the captured images P11 to P13 captured in this way.

In the example of FIG. 9, at time T3, the estimated falling position range represented by an ellipse is estimated. Among the captured images P11 to P13, the region in which the estimated falling position range and the position directly below the unmanned aircraft 1 at time T3 are captured is used for generating the composite image.

Figure 10:
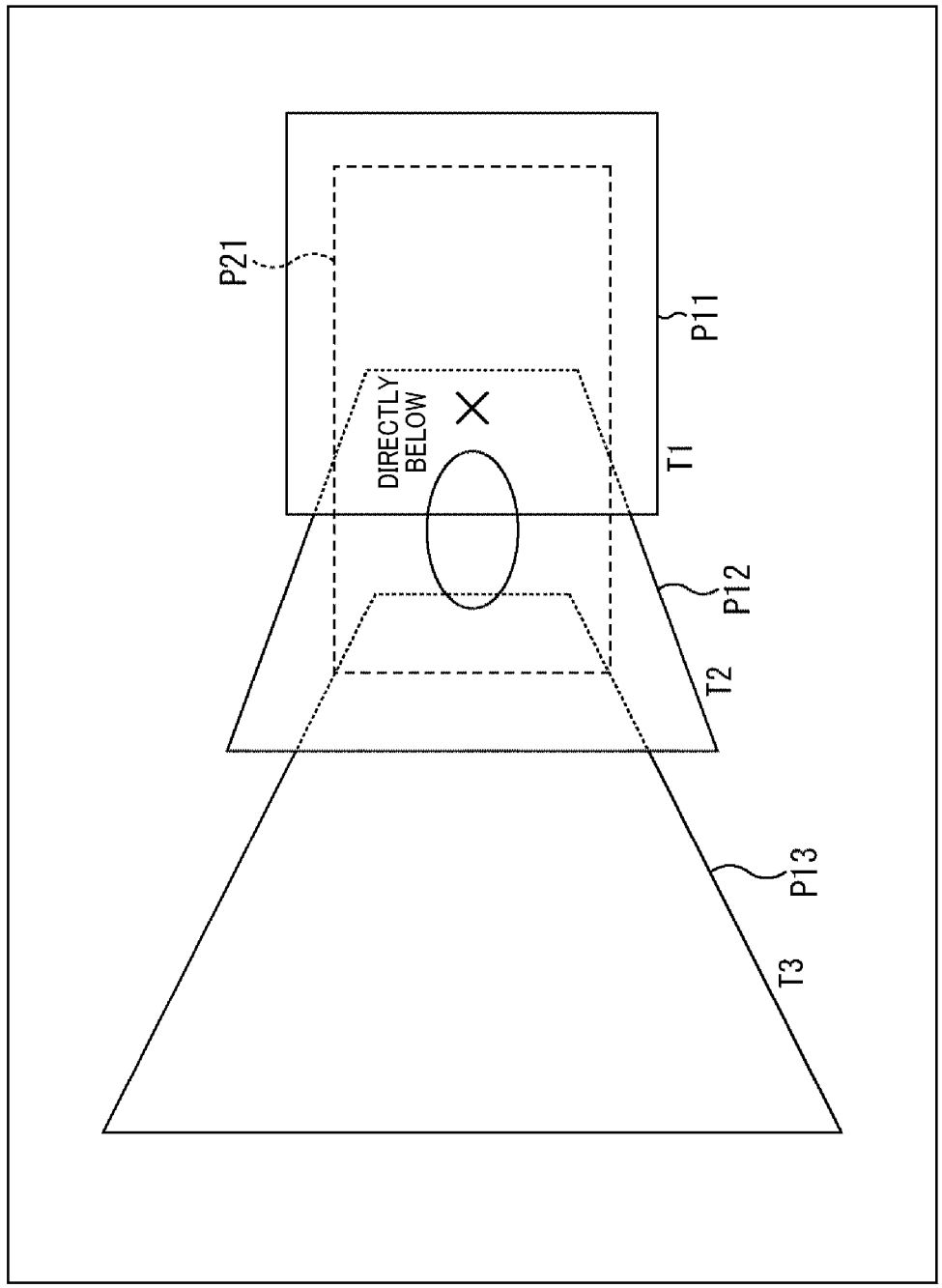
FIG. 10 is a diagram showing an example of a method of synthesizing captured images.

FIG. 10 is a diagram showing an example of a method of synthesizing captured images.

When the captured images P11 to P13 are viewed from directly above, the angle of view of each image is represented as a shape as shown in FIG. 10. FIG. 10 shows the shape of each image when viewed from directly above with respect to a plane representing the ground.

In the image synthesis unit 39, the captured images P11 to P13 are projected and converted with respect to the plane representing the ground using the position and attitude of the unmanned aircraft 1 and the internal and external parameters of the camera.

In the image synthesis unit 39, the captured images P11 to P13 after the projective conversion are synthesized so as to be stitched together, and a range including the position corresponding to the position directly below at time T3 and the estimated falling position range is cut out. In the example of FIG. 10, an image showing the range indicated by a broken line is cut out as a cut-out image P21.

In the image synthesis unit 39, a composite image is generated by synthesizing a falling position image representing the estimated falling position range and the position corresponding to the position directly below on the cut-out image P21. The composite image generated in this way is output from the image synthesis unit 39 to the data transmitting unit 40 of FIG. 7.

When a plurality of cameras is provided in the unmanned aircraft 1, the captured images in which the estimated falling position range and the angle of view overlap are used for generating the composite image.

The data transmitting unit 40 transmits the composite image supplied from the image synthesis unit 39 to the controller 2. The composite image transmitted by the data transmitting unit 40 is displayed on the display 3A of the smartphone 3 and is used for instructing the direction of movement of the unmanned aircraft 1.

The data receiving unit 41 receives a control command representing the content of the user's operation transmitted from the controller 2 and outputs the control command to the aircraft control unit 42. The control command indicates, for example, the direction instructed by the user who viewed the composite image.

The aircraft control unit 42 determines whether a failure has occurred on the basis of the failure and fall determination information supplied from the failure and fall determination unit 38, and sets an operation mode.

The operation mode of the unmanned aircraft 1 includes an in-flight mode and a falling mode. The in-flight mode is an operation mode set when a failure has not occurred, and the falling mode is an operation mode set when a failure has occurred.

The aircraft control unit 42 controls the movement of the unmanned aircraft 1 in response to the control command supplied from the data receiving unit 41.

When the operation mode is the in-flight mode, the aircraft control unit 42 controls the position and attitude in an aircraft coordinate system.

The aircraft coordinate system represents the coordinate system in the unmanned aircraft 1. When the operation mode is the in-flight mode, the user who operates the controller 2 performs an operation on the aircraft coordinate system to control the movement of the unmanned aircraft 1.

On the other hand, when the operation mode is the falling mode, the aircraft control unit 42 performs control in consideration of the failure location on the basis of the self-position and motion estimation result supplied from the self-position and motion estimation unit 36 and the failure and fall determination information supplied from the failure and fall determination unit 38.

In this case, the aircraft control unit 42 converts the direction of the user's instruction represented by a composite image coordinate system into the direction of the aircraft coordinate system and performs control. Since the direction of the user's instruction represented by the control command is the direction in which the composite image is viewed, it is represented as the direction of the composite image coordinate system, which is the coordinate system in the composite image.

That is, when the operation mode is the falling mode, the user who operates the controller 2 performs an operation on the composite image coordinate system to control the movement of the unmanned aircraft 1.

Figure 11:
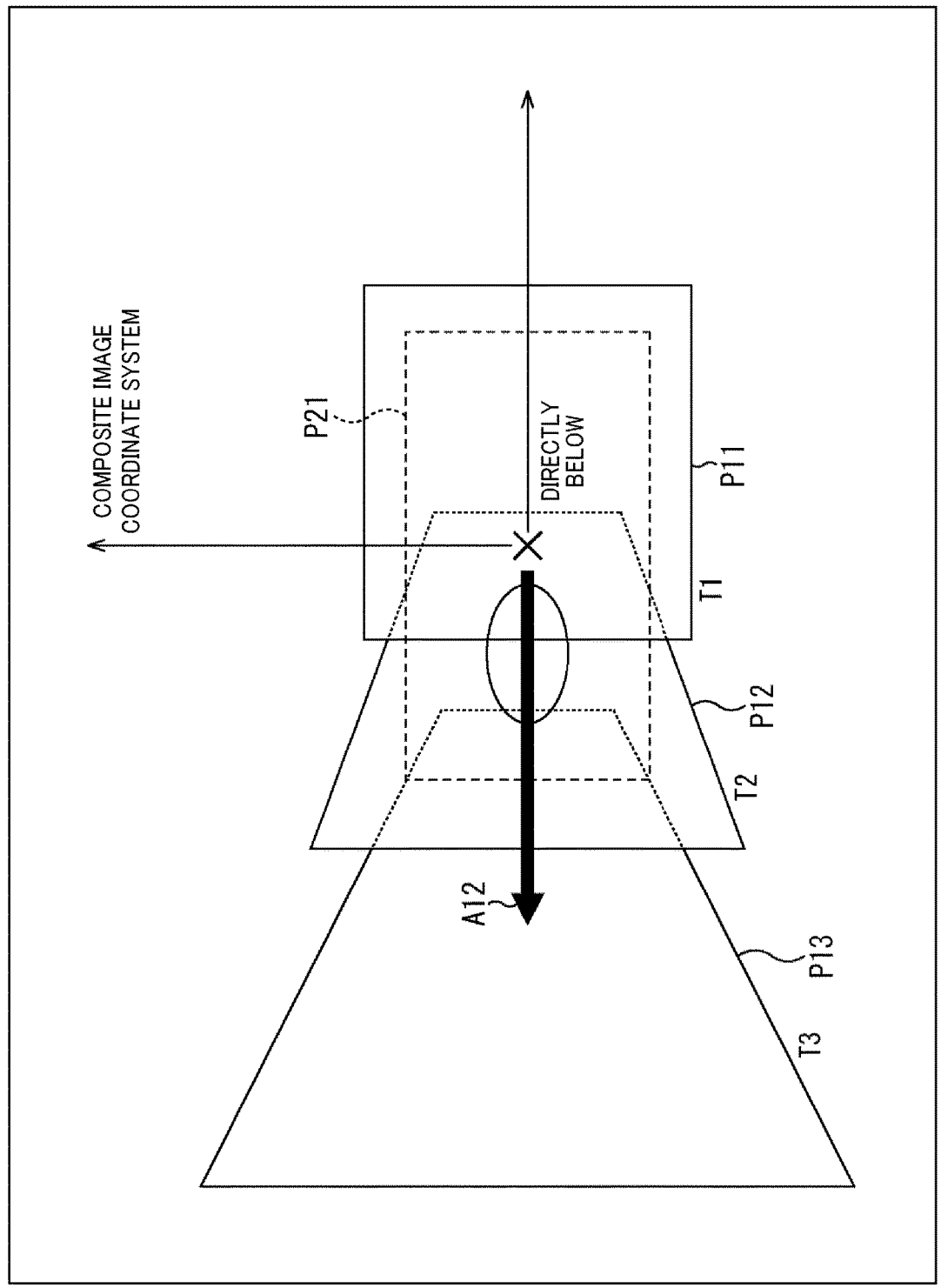
FIG. 11 is a diagram showing an example of a direction on a composite image coordinate system represented by a control command.

FIG. 11 is a diagram showing an example of a direction on the composite image coordinate system represented by a control command.

When an object to avoid a collision exists within the estimated falling position range, transmits a control command instructing the movement to the left with respect to the composite image to the unmanned aircraft 1 by an operation such as tilting the stick of the controller 2 to the left. At this time, as indicated by arrow A12 in FIG. 11, a control command instructing the movement to the left on the composite image coordinate system is transmitted to the unmanned aircraft 1.

By instructing the movement in the depth direction in the composite image, it is possible to perform control so as to accelerate the fall.

Figure 12:
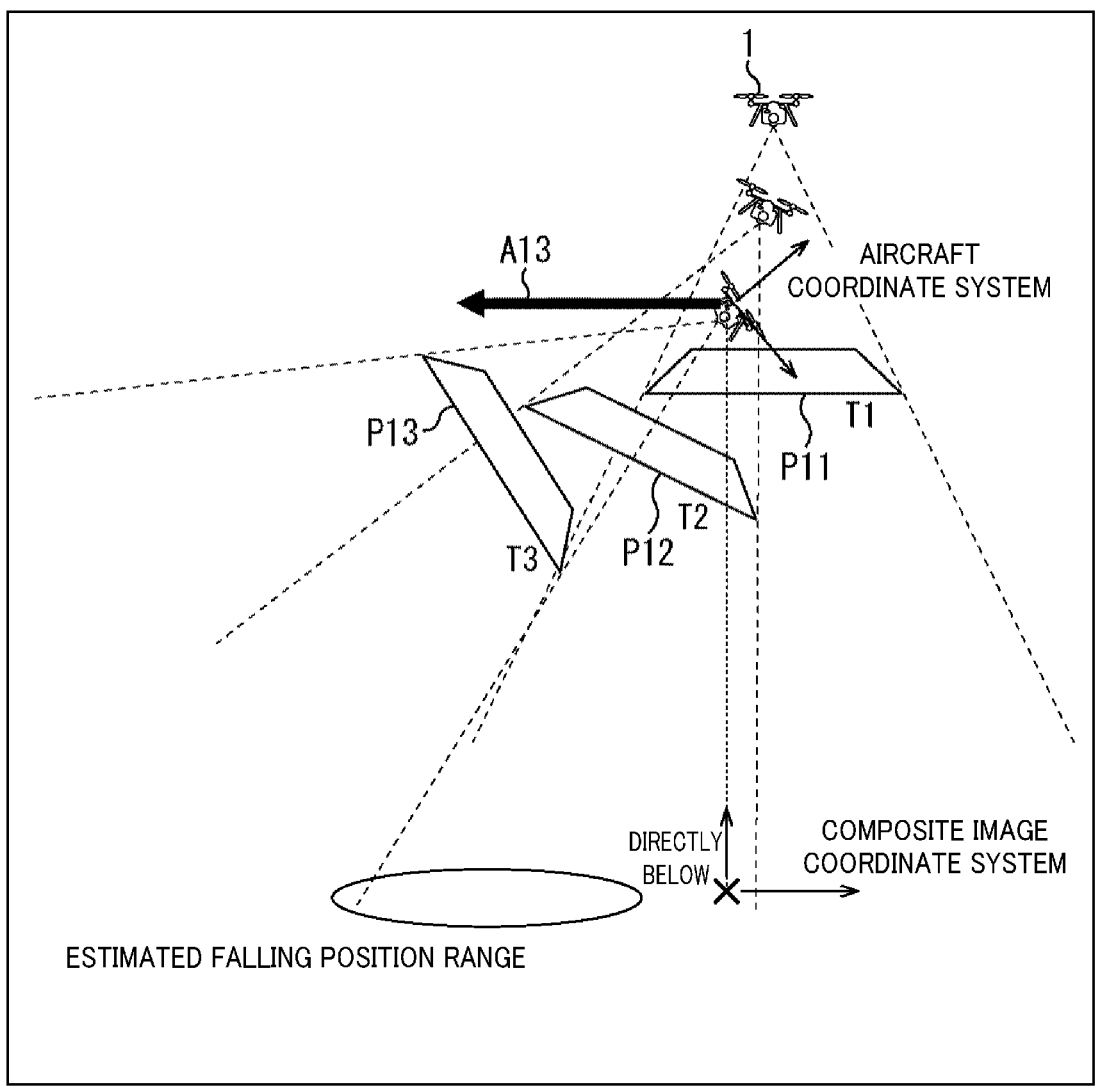
FIG. 12 is a diagram showing an example of controlling the movement of an unmanned aircraft that has received a control command.

FIG. 12 is a diagram showing an example of controlling the movement of the unmanned aircraft 1 that has received the control command.

When the movement to the left as described with reference to FIG. 11 is instructed on the composite image, the aircraft control unit 42 controls the aircraft so that the actual falling position is located to the left of the estimated falling position range as indicated by arrow A13 in FIG. 12.

Specifically, the aircraft control unit 42 converts the direction designated by the user into the direction on the aircraft coordinate system at time T3 using a predetermined conversion matrix and controls the aircraft.

When it is not possible to move in any direction due to a motor failure or the like, the aircraft control unit 42 considers the position and attitude of the aircraft, and controls the direction of rotation of an operable motor so that thrust is generated in the direction designated by the user.

Figure 13:
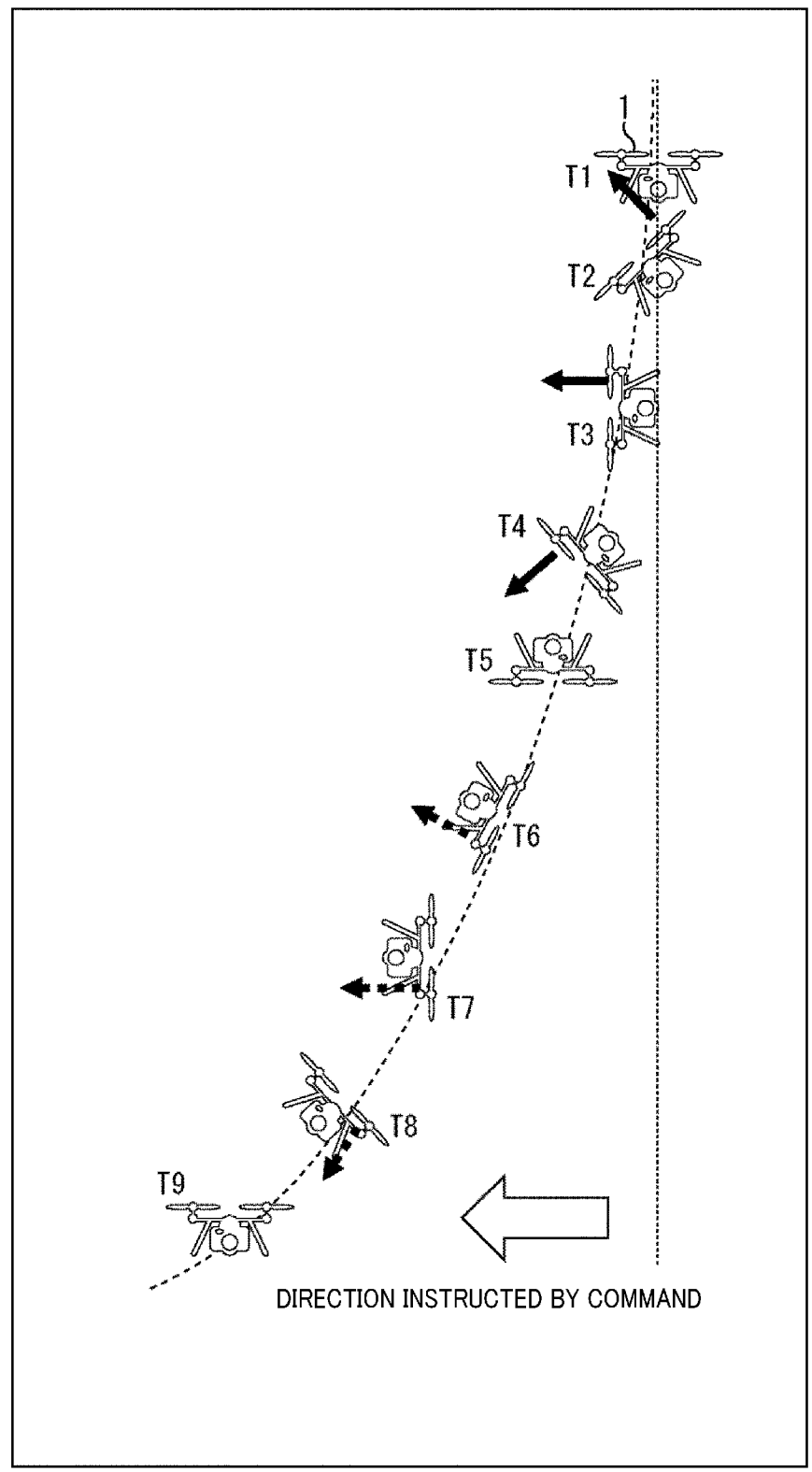
FIG. 13 is a diagram showing an example of the direction of rotation of a motor in a falling mode.

FIG. 13 is a diagram showing an example of the direction of rotation of the motor in the falling mode.

FIG. 13 shows the states of the unmanned aircraft 1 that falls while rotating at each time of times T1 to T9. Further, as indicated by a blank arrow, it is assumed that the user who has viewed the composite image has designated the movement to the left.

When there is only one operable motor, the aircraft control unit 42 rotates the motor in a direction in which the inner product of the thrust vector generated when the motor is rotated and the direction vector pointing in the direction designated by the user becomes positive.

In FIG. 13, it is assumed that, among two propeller motors, the left propeller motor fails with reference to, for example, the direction at time T1 in which the vertical direction is correct, and only the right propeller motor can operate. A solid arrow shown near the motor of the propeller on the right side represents the thrust vector generated by the forward rotation of the motor. A dotted arrow represents the thrust vector generated by the reverse rotation of the motor. Here, the forward rotation represents rotation in a direction in which buoyancy is generated in a normal state.

At time T1 when the upper surface of the aircraft is facing straight up, the internal product of the thrust vector generated by rotating the motor and the direction vector facing in the direction designated by the user becomes 0, so the aircraft control unit 42 does not rotate the motor.

On the other hand, at times T2 to T4 when the upper surface of the aircraft is facing to the left, the aircraft control unit 42 rotates the motor in the forward direction so as to generate a thrust vector whose inner product with the direction vector pointing in the direction designated by the user is positive. In this way, the unmanned aircraft 1 will fall while shifting to the left.

At time T5 when the upper surface of the aircraft is facing directly below, the internal product of the thrust vector generated by rotating the motor and the direction vector facing in the direction designated by the user becomes 0, so the aircraft control unit 42 does not rotate the motor.

At times T6 to T8 when the upper surface of the aircraft is facing to the right, the aircraft control unit 42 rotates the motor in the reverse direction so as to generate a thrust vector whose inner product with the direction vector pointing in the direction designated by the user is positive. In this way, the unmanned aircraft 1 will fall while shifting to the left.

At time T9 when the upper surface of the aircraft is facing straight up, the internal product of the thrust vector generated by rotating the motor and the direction vector pointing in the direction designated by the user is 0, so the aircraft control unit 42 does not rotate the motor.

As described above, the aircraft control unit 42 can shift the falling position to the left by controlling the direction of rotation of the motor that can operate so as to generate a thrust to the left designated by the user.

Configuration of Controller 2

Figure 14:
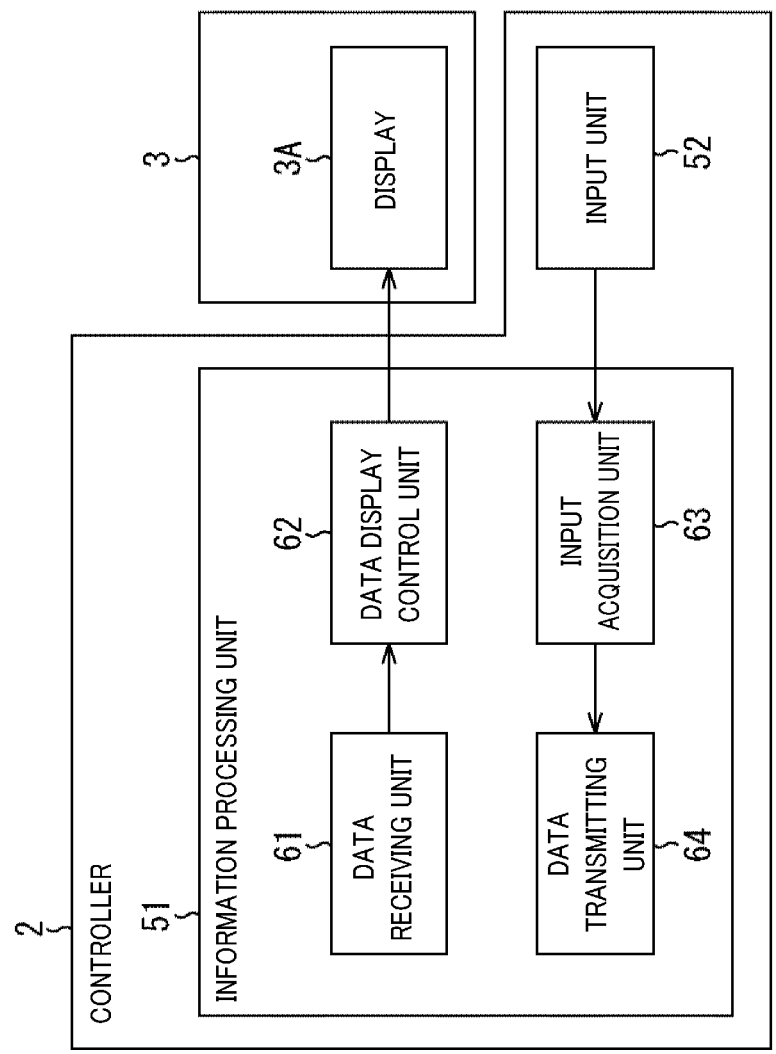
FIG. 14 is a diagram showing a configuration example of a controller.

FIG. 14 is a diagram showing a configuration example of the controller 2. The smartphone 3 is connected to the controller 2 via wired or wireless communication.

As shown in FIG. 14, the controller 2 includes an information processing unit 51 and an input unit 52.

The information processing unit 51 includes a data receiving unit 61, a data display control unit 62, an input acquisition unit 63, and a data transmitting unit 64.

The data receiving unit 61 receives the composite image transmitted from the unmanned aircraft 1 and outputs the same to the data display control unit 62.

The data display control unit 62 outputs the composite image supplied from the data receiving unit 61 to the display 3A of the smartphone 3 and displays the same.

The input acquisition unit 63 acquires the instruction information output from the input unit 52 and outputs the instruction information to the data transmitting unit 64. The instruction information represents the direction and the amount of movement designated by the user.

The data transmitting unit 64 transmits the instruction information supplied from the input acquisition unit 63 to the unmanned aircraft 1 as a control command.

The input unit 52 is configured of a stick, a touch panel, or the like. The input unit 52 detects the user's operation and outputs instruction information according to the detected user's operation.

<Operation of Each Device>

Here, the operation of each device having the above-described configuration will be described.

Operation of Unmanned Aircraft 1

First, the fall damage mitigation process of the unmanned aircraft 1 will be described with reference to the flowchart of FIG. 15.

Figure 15:
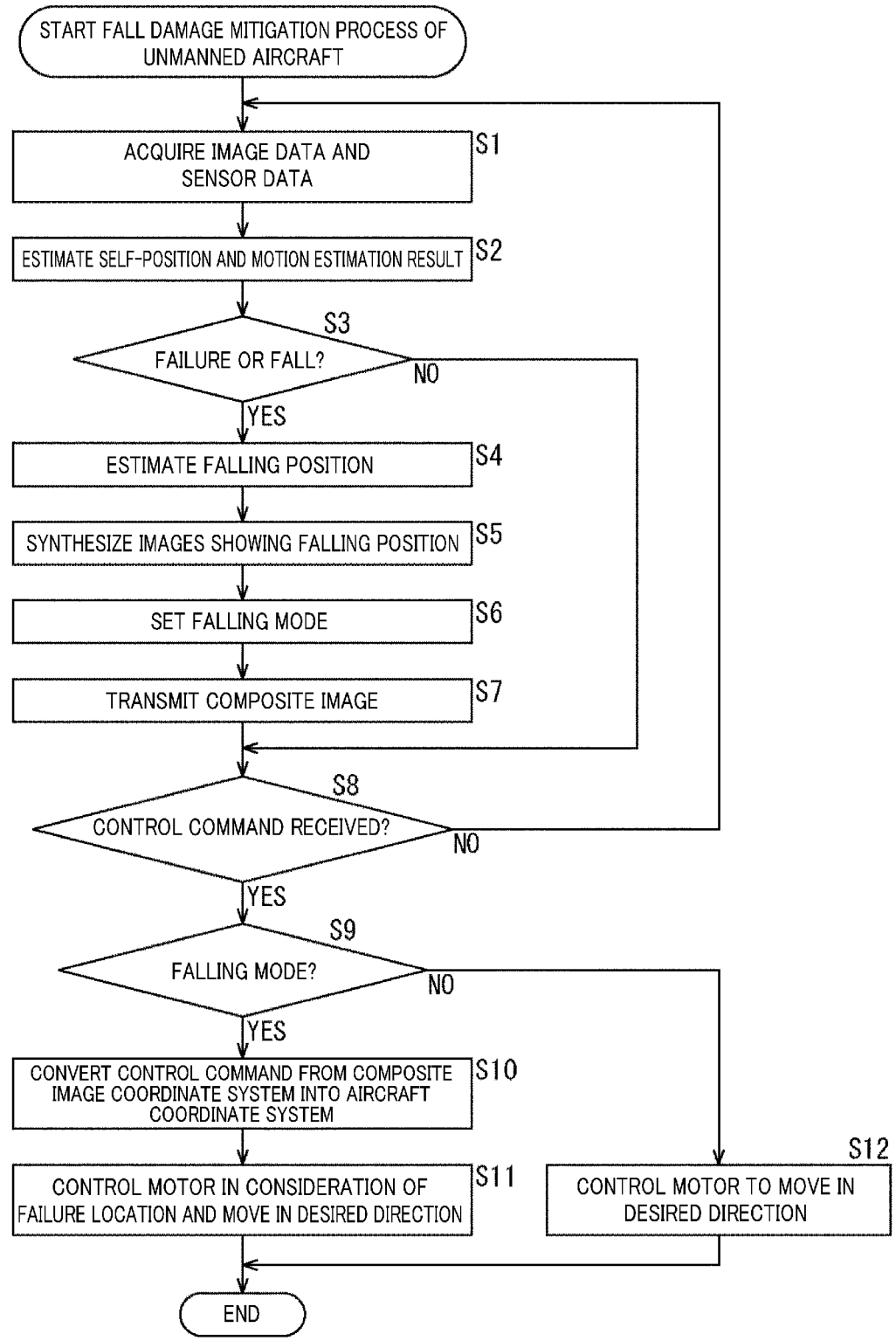
FIG. 15 is a flowchart illustrating a fall damage mitigation process for an unmanned aircraft.

The fall damage mitigation process of FIG. 15 is started, for example, when the flight of the unmanned aircraft 1 is started. The operation mode of the unmanned aircraft 1 at the start of processing is the in-flight mode.

In step S1, the information processing unit 12 acquires the sensor data supplied from the sensor 11. Specifically, the wind speed vector acquisition unit 31, the image acquisition unit 32, the position information acquisition unit 33, and the IMU information acquisition unit 34 acquire wind speed information, image data and distance information, position information, and IMU information, respectively.

In step S2, the self-position and motion estimation unit 36 estimates the self-position and motion estimation result on the basis of the image data, the distance information, the position information, and the IMU information.

In step S3, the failure and fall determination unit 38 determines whether the aircraft of the unmanned aircraft 1 has failed or fallen on the basis of the information indicating the internal state and the self-position and motion estimation result.

If it is determined in step S3 that the aircraft of the unmanned aircraft 1 has failed or fallen, the process proceeds to step S4.

In step S4, the falling position estimation unit 37 estimates the falling position of the unmanned aircraft 1 during the fall on the basis of the wind speed information and the self-position and motion estimation result.

In step S5, the image synthesis unit 39 generates a composite image by synthesizing the falling position image with the image showing the falling position on the basis of the image data, the self-position and motion estimation result, the falling position estimation result, and the failure and fall determination information.

In step S6, the aircraft control unit 42 sets the operation mode to the falling mode on the basis of the failure and fall determination information.

In step S7, the data transmitting unit 40 transmits the composite image to the controller 2.

If the composite image is transmitted to the controller 2 in step S7, or if it is determined in step S3 that the aircraft of the unmanned aircraft 1 has neither failed nor fallen, the process proceeds to step S8.

In step S8, the data receiving unit 41 determines whether the control command has been received from the controller 2.

If it is determined in step S8 that the control command has not been received, the process returns to step S1 and the subsequent processing is performed.

On the other hand, if it is determined in step S8 that the control command has been received, the process proceeds to step S9. A control command is supplied from the data receiving unit 41 to the aircraft control unit 42.

In step S9, the aircraft control unit 42 determines whether the operation mode is the falling mode.

If it is determined in step S9 that the operation mode is the falling mode, the process proceeds to step S10.

In step S10, the aircraft control unit 42 converts the direction represented by the control command from the direction in the composite image coordinate system to the direction in the aircraft coordinate system on the basis of the composite image.

In step S11, the aircraft control unit 42 controls the motor of the unmanned aircraft 1 in consideration of the failure location on the basis of the self-position and motion estimation result and the failure and fall determination information, and moves the unmanned aircraft 1 in the desired direction corresponding to the control command.

On the other hand, if it is determined in step S9 that the operation mode is not the falling mode, the process proceeds to step S12.

In step S12, the aircraft control unit 42 controls the motor of the unmanned aircraft 1, and moves the unmanned aircraft 1 in a desired direction corresponding to the control command.

The above processing is repeated during the flight or the fall of the unmanned aircraft 1.

Operation of Controller 2

Figure 16:
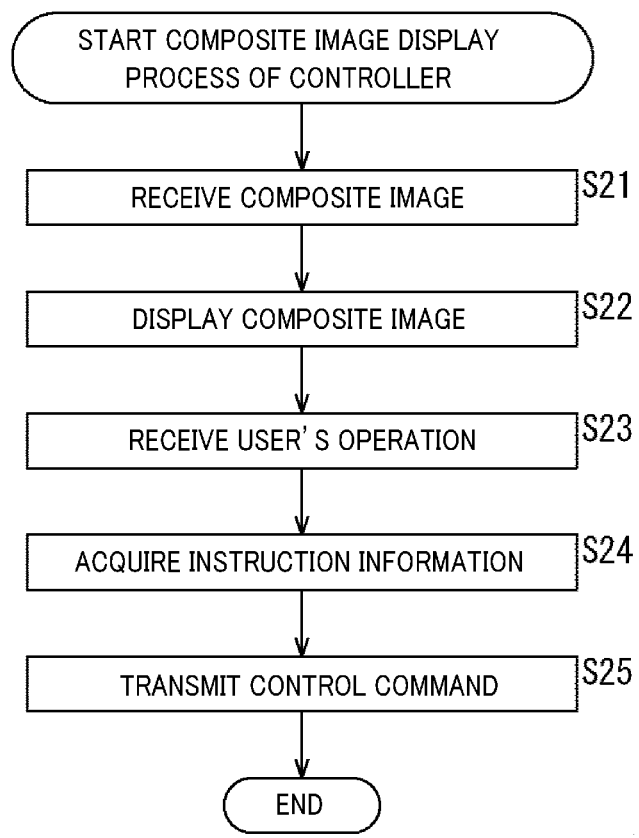
FIG. 16 is a flowchart illustrating a composite image display process of the controller.

Next, the composite image display process of the controller 2 will be described with reference to the flowchart of FIG. 16.

In step S21, the data receiving unit 61 of the controller 2 receives the composite image transmitted from the unmanned aircraft 1.

In step S22, the data display control unit 62 outputs the composite image to the display 3A of the smartphone 3 and displays the same.

In step S23, the input unit 52 receives the user's operation and generates instruction information.

In step S24, the input acquisition unit 63 acquires the instruction information.

In step S25, the data transmitting unit 64 transmits the instruction information as a control command to the unmanned aircraft 1.

By the above-described processing, the user can allow the unmanned aircraft 1 to fall at a position where damage at the time of falling is considered to be reduced according to the user's values and the situation at the time of falling.

<Example of Second Control of Unmanned Aircraft>

The falling position may be designated by the user instead of the fall direction. In this case, the aircraft of the unmanned aircraft 1 is controlled so as to fall at a position designated by the user.

Figure 17:
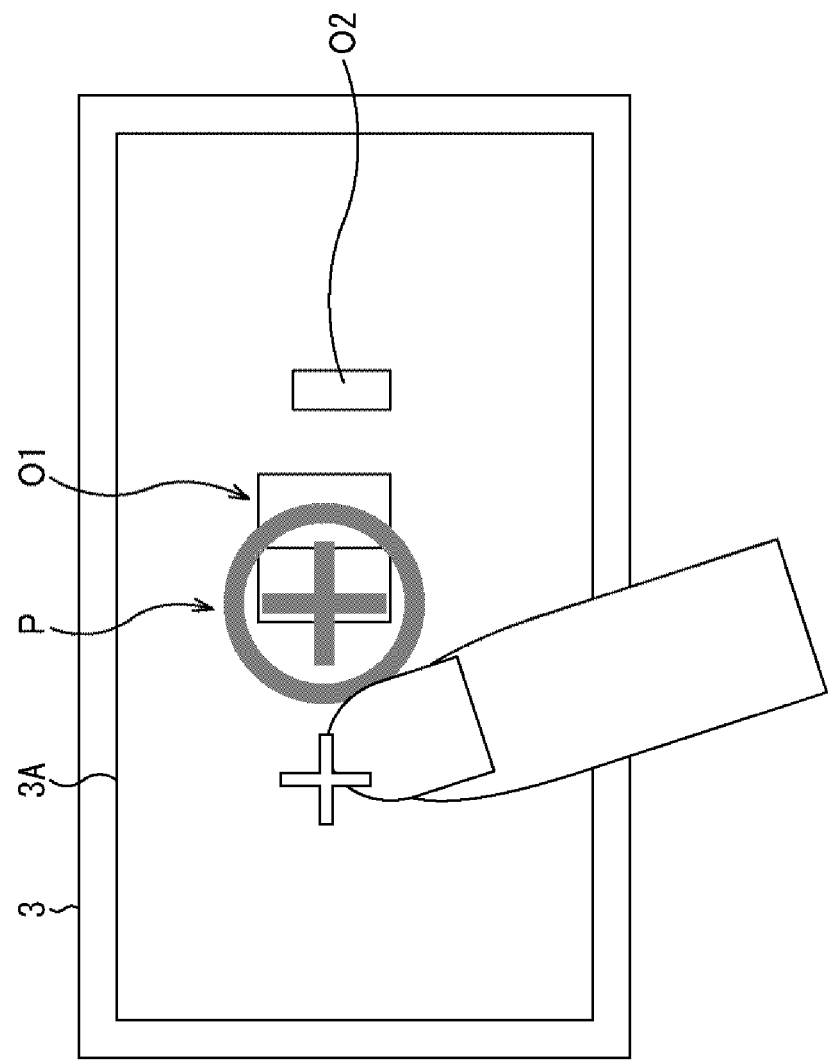
FIG. 17 is a diagram showing an example of a user's operation for designating a falling position.

FIG. 17 is a diagram showing an example of a user's operation for designating a falling position.

As shown in FIG. 17, the user designates the falling position by touching on the display 3A having a touch panel. In FIG. 17, the position where there is no house O1 or car O2, which is indicated by a blank cross, is designated by the user.

In this case, the smartphone 3 functioning as a transmitter transmits a control command representing a position designated by the user to the unmanned aircraft 1.

Figure 18:
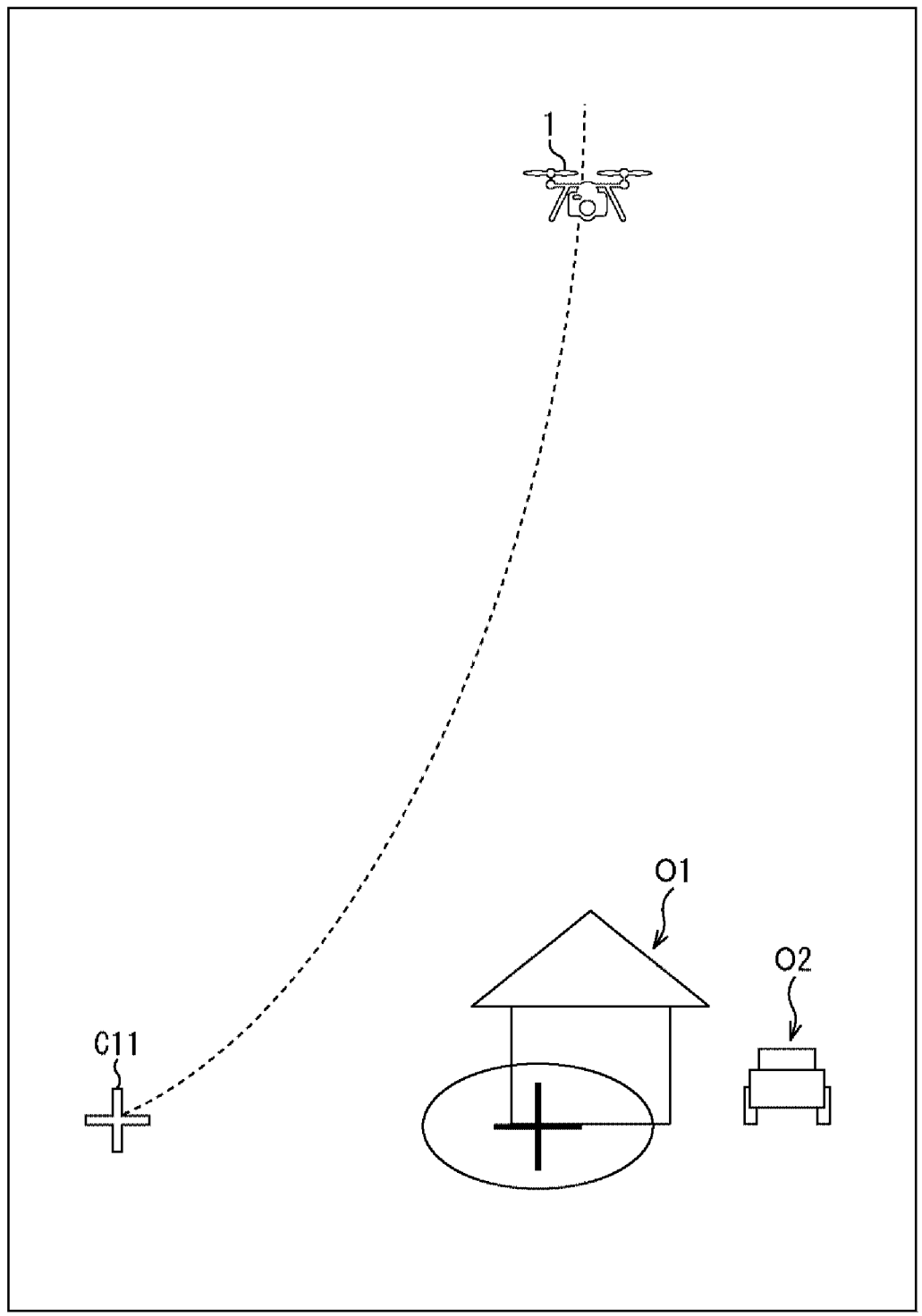
FIG. 18 is a diagram showing an example of the movement of an unmanned aircraft that has received a control command.

FIG. 18 is a diagram showing an example of movement of the unmanned aircraft 1 that has received a control command.

The position C11 indicated by a blank cross on the left side of FIG. 18 represents a position in an actual three-dimensional space corresponding to the position on the composite image designated by the user.

Upon receiving the control command, the unmanned aircraft 1 controls the aircraft so as to fall at the position C11 according to the control command, as indicated by the broken line.

Figure 19:
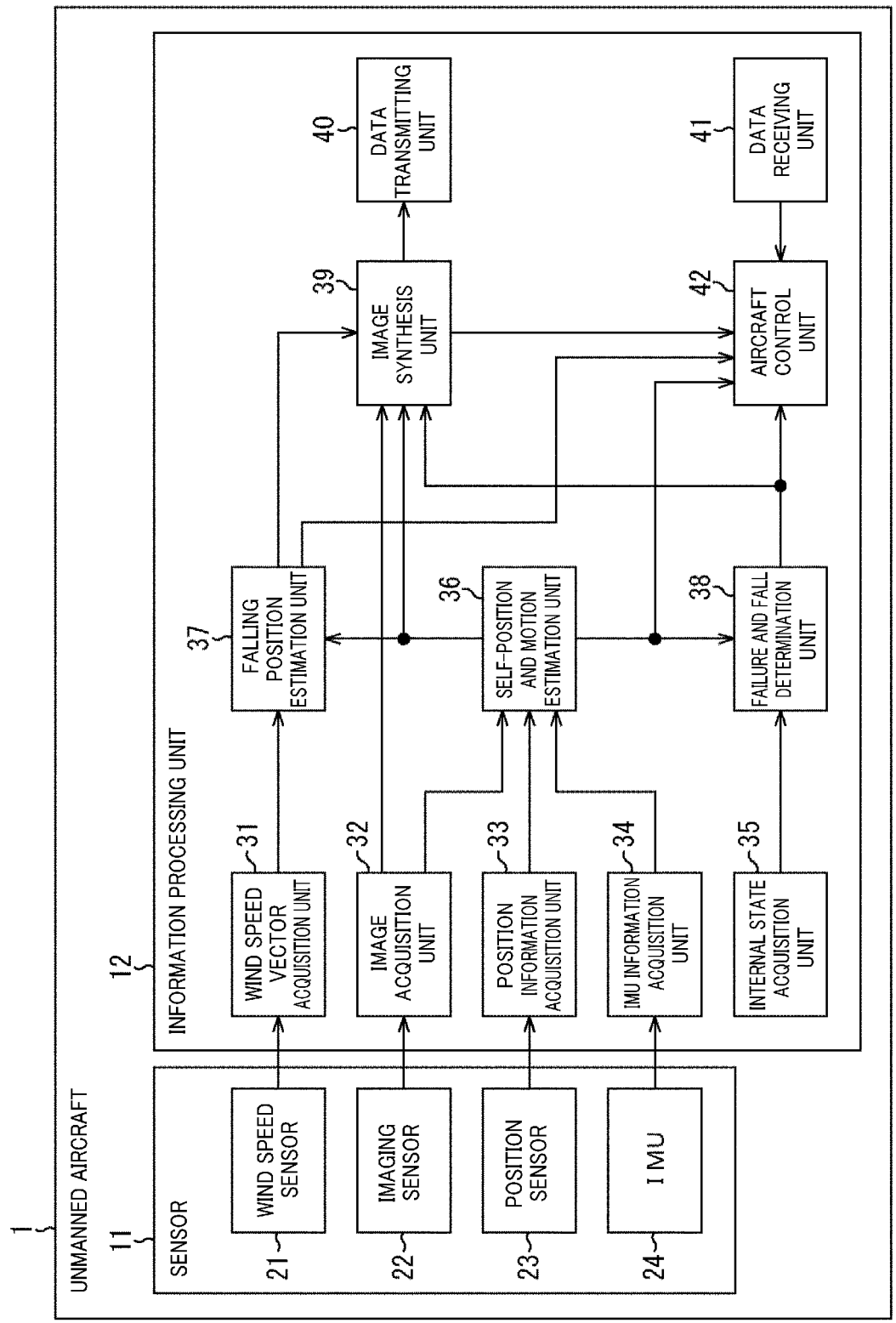
FIG. 19 is a block diagram showing a configuration example of an unmanned aircraft that receives a control command for designating a falling position.

FIG. 19 is a block diagram showing a configuration example of the unmanned aircraft 1 that receives a control command for designating a falling position.

The configuration of the unmanned aircraft 1 shown in FIG. 19 is the same as the configuration described with reference to FIG. 7, except that the falling position estimation unit 37 and the aircraft control unit 42 are connected. Duplicate explanation will be omitted as appropriate.

The aircraft control unit 42 of FIG. 19 is supplied with the same information as the falling position estimation result supplied to the image synthesis unit 39 from the falling position estimation unit 37.

The aircraft control unit 42 calculates the falling position in the three-dimensional space designated by the user on the basis of the control command for designating the falling position supplied from the data receiving unit 61. The aircraft control unit 42 performs feedback control on the basis of the difference between the falling position designated by the user and the falling position estimation result, and moves the aircraft of the unmanned aircraft 1 to the falling position designated by the user.

As described above, the user can allow the unmanned aircraft 1 to fall at a designated position according to the user's values and situation. For example, when it is desired that the unmanned aircraft 1 falls between the objects shown in the composite image, the user can allow the unmanned aircraft 1 to fall at such a desired position.

<Example of Third Control of Unmanned Aircraft>

The object detection result, which is the result of detecting the object appearing in the composite image, may be synthesized with the composite image as information assisting the user.

Figure 20:
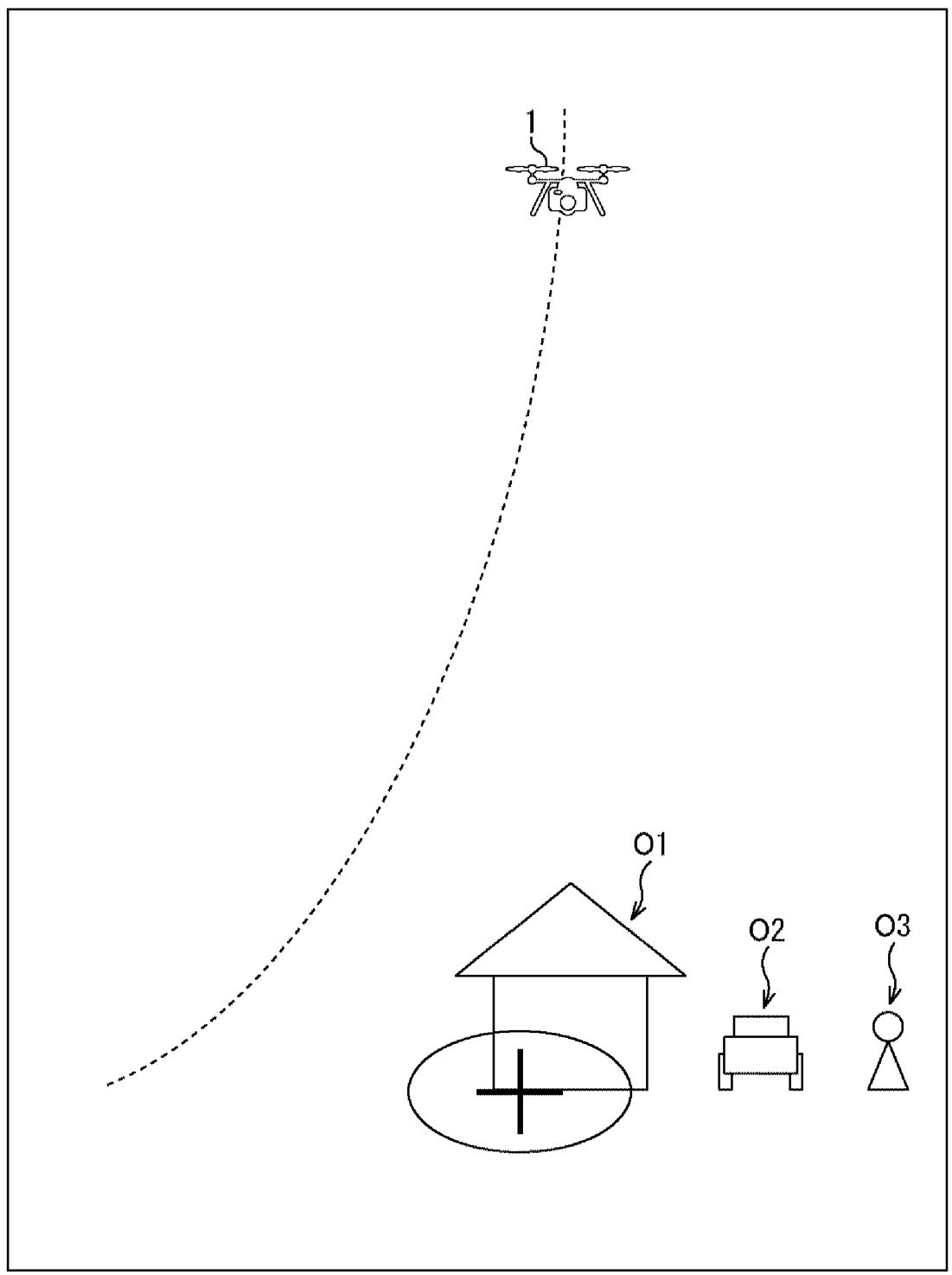
FIG. 20 is a diagram showing an example of objects in the vicinity of a falling position of an unmanned aircraft.

FIG. 20 is a diagram showing an example of an object in the vicinity of the falling position of the unmanned aircraft 1.

In the example of FIG. 20, the falling position of the unmanned aircraft 1 is the position on the house O1. The car O2 is parked next to the house O1, and a person O3 is standing next to the car O2.

The unmanned aircraft 1 detects an object on an image showing a falling position, and detects the house O1, the car O2, and the person O3. Specific objects such as a house, a car, and a person are detected.

The unmanned aircraft 1 generates a composite image in which pieces of information representing the house O1, the car O2, and the person O3 are synthesized, and transmits the composite image to the controller 2 to display the same on the smartphone 3.

Figure 21:
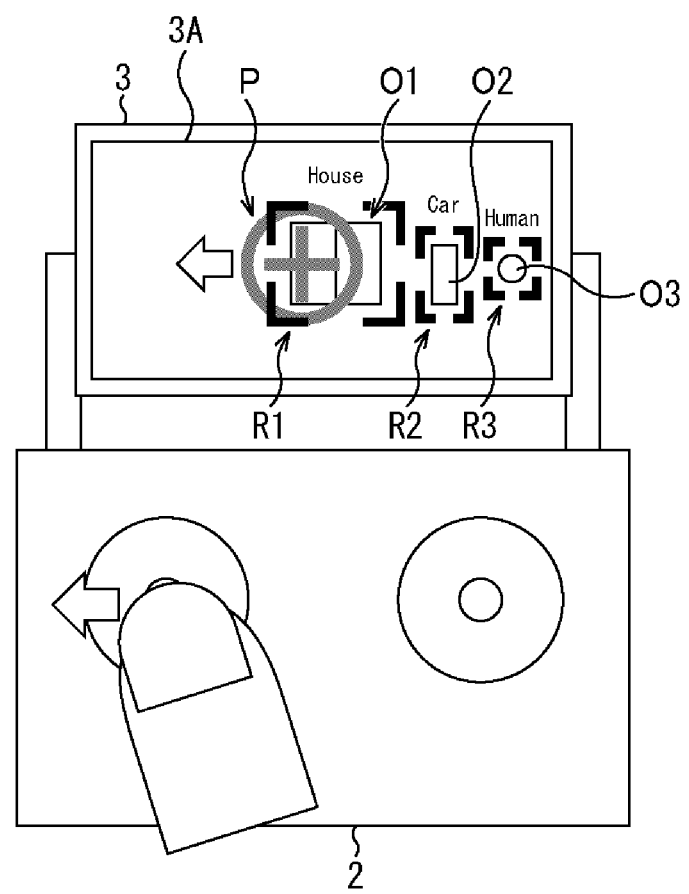
FIG. 21 is a diagram showing a display example of a composite image in which object detection results are synthesized.

FIG. 21 is a diagram showing a display example of a composite image in which the object detection results are synthesized.

As shown in FIG. 21, a composite image is displayed on the display 3A of the smartphone 3. In the composite image, the house O1, the car O2, and the person O3 are photographed side by side.

In the composite image of FIG. 21, rectangular information R1 in which L-shaped lines are synthesized is displayed so as to surround the house O1. The rectangular information R1 represents a region on the composite image in which the house is detected. Above the rectangular information R1, the character information of "House" indicating that there is a house is displayed.

Similarly, rectangular information R2 is displayed so as to surround the car O2. The rectangular information R2 represents a region on the composite image in which the car is detected. Above the rectangular information R2, the character information of "Car" indicating that there is a car is displayed.

Rectangular information R3 is displayed so as to surround the person O3. The rectangular information R3 represents a region on the composite image in which a person is detected. Above the rectangular information R3, the character information of "Human" representing a person is displayed.

The user can recognize the type of object that the unmanned aircraft 1 may collide with by looking at the rectangular information and the character information displayed on the composite image.

Information indicating the moving direction recommended for the user may be displayed on the composite image on the basis of the object detection result and the fall estimation range.

Figure 22:
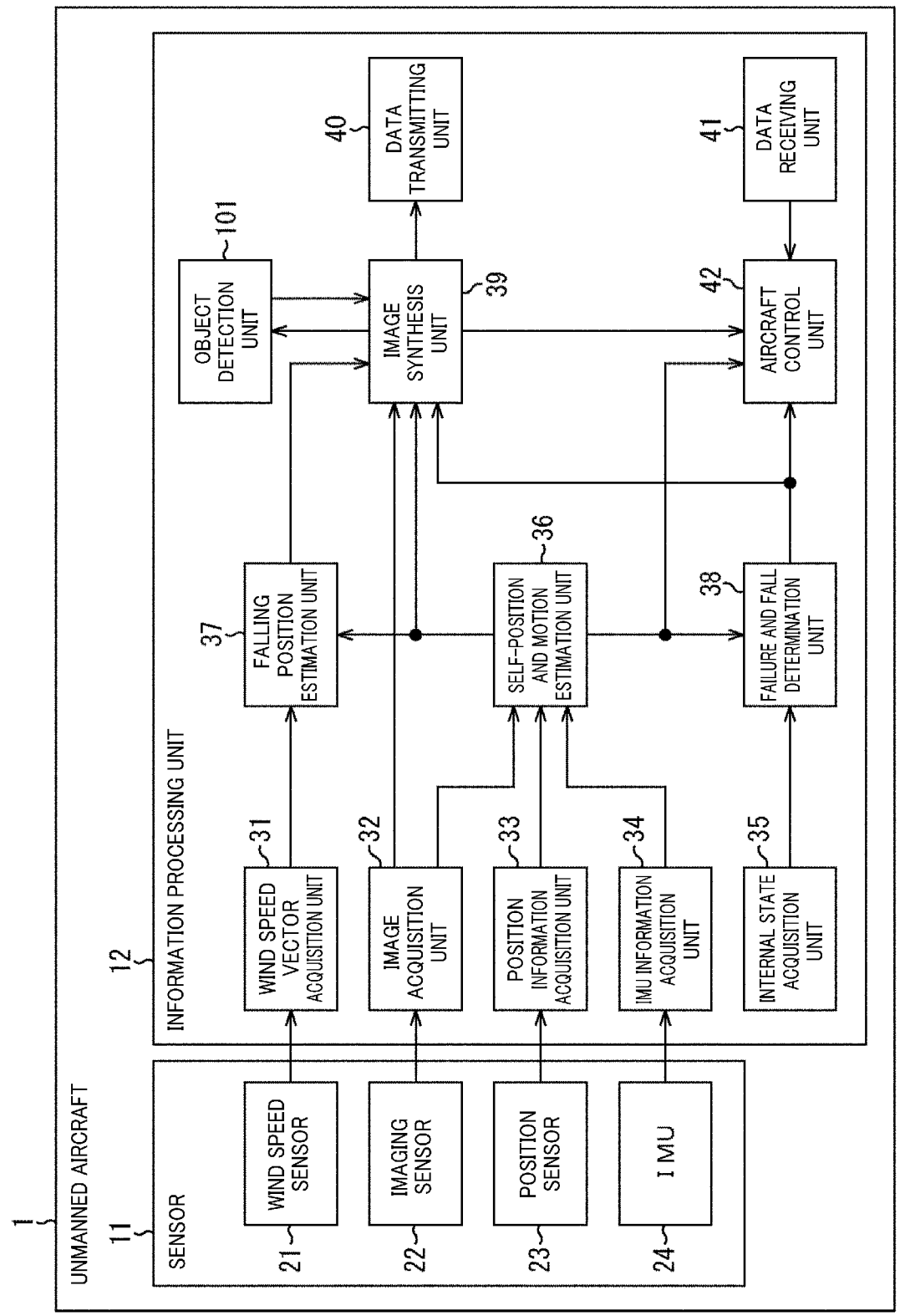
FIG. 22 is a block diagram showing a configuration example of an unmanned aircraft that detects an object appearing in a composite image.

FIG. 22 is a block diagram showing a configuration example of the unmanned aircraft 1 that detects an object appearing in a composite image.

The configuration of the unmanned aircraft 1 shown in FIG. 22 is the same as the configuration described with reference to FIG. 7, except that an object detection unit 101 is provided. Duplicate explanation will be omitted as appropriate.

The image synthesis unit 39 outputs an image in which the falling position is captured to the object detection unit 101. The object detection unit 101 is supplied with an image in which the falling position is captured, which is generated by the image synthesis unit 39 as described with reference to FIG. 10, for example.

The image synthesis unit 39 generates a composite image by synthesizing rectangular information and character information together with the falling position image with the image showing the falling position on the basis of the object detection result supplied from the object detection unit 101.

The object detection unit 101 detects an object on the image supplied from the image synthesis unit 39. The object detection unit 101 outputs the object detection result to the image synthesis unit 39.

Here, with reference to the flowchart of FIG. 23, the fall damage mitigation process performed by the unmanned aircraft 1 having the above-described configuration will be described.

The processes of steps S51 to S56 are the same as the processes of steps S1 to S6 of FIG. 15, respectively. That is, when the aircraft of the unmanned aircraft 1 fails, an image showing the falling position is synthesized, and the operation mode of the unmanned aircraft 1 is set to the falling mode.

In step S57, the object detection unit 101 detects an object on an image in which the falling position is captured.

In step S58, the image synthesis unit 39 generates a composite image by synthesizing the rectangular information and the character information together with the falling position image with the image showing the falling position on the basis of the object detection result.

The processes of steps S59 to S64 are the same as the processes of steps S7 to S12 of FIG. 15, respectively. That is, the composite image is transmitted to the controller 2, and the movement of the unmanned aircraft 1 is controlled according to the operation by the user.

As described above, the user can recognize the type of object that the unmanned aircraft 1 may collide with, and can allow the unmanned aircraft 1 to fall at a position where the damage at the time of falling is considered to be reduced according to the user's values and the situation at the time of falling.

<Example of Fourth Control of Unmanned Aircraft>

An action plan may be made on the unmanned aircraft 1 on the basis of an object detection result or the like, and the movement of the unmanned aircraft 1 may be autonomously controlled according to the planned action. For example, the actions required to avoid collisions with objects in the composite image are planned.

Figure 24:
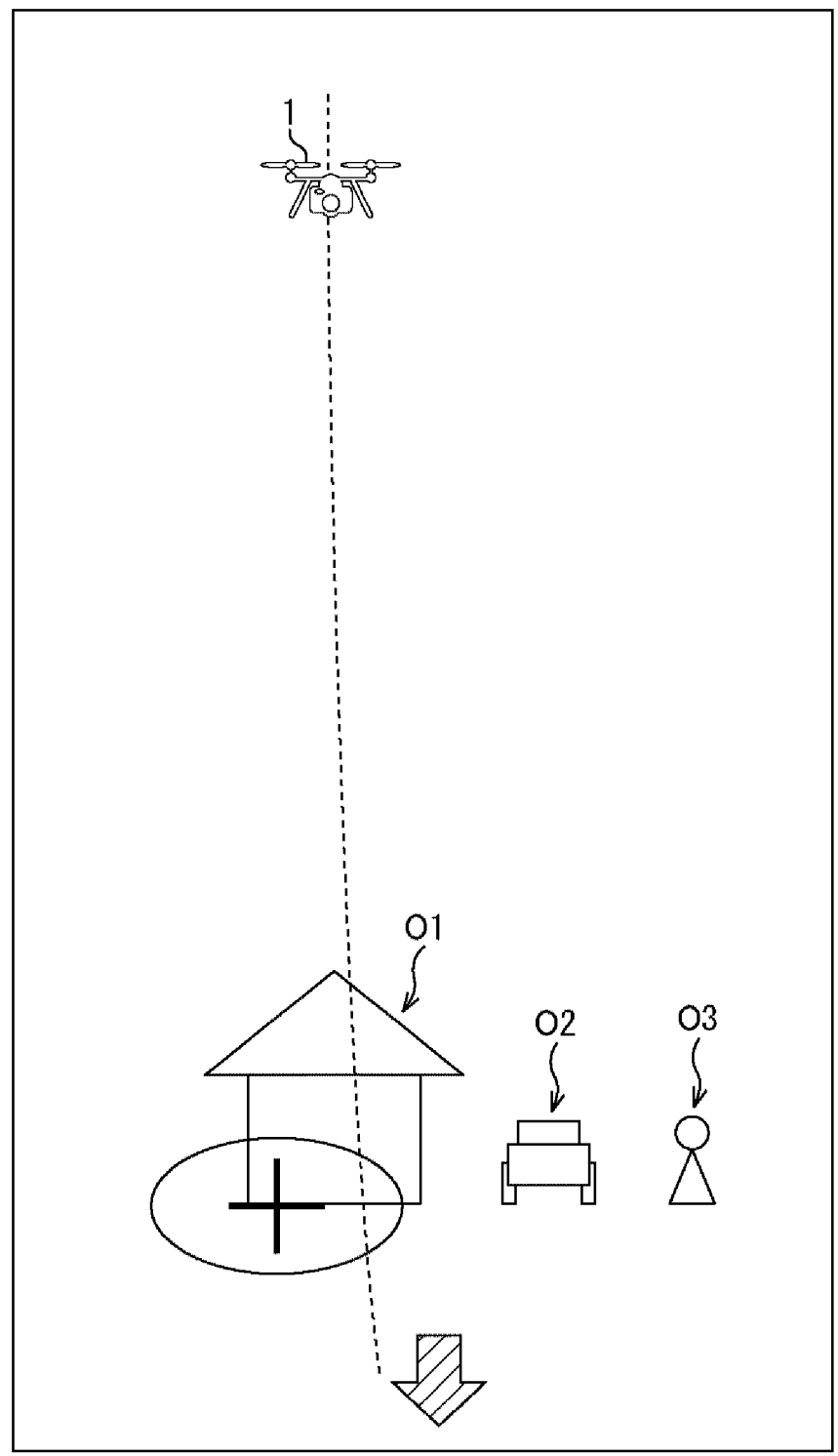
FIG. 24 is a diagram showing an example of actions for avoiding a collision.

FIG. 24 is a diagram showing an example of actions for avoiding a collision.

As shown in FIG. 24, when the position on the house O1 is the falling position, the unmanned aircraft 1 detects the house O1, the car O2, and the person O3 on the basis of the image showing the falling position, and plans the actions necessary to avoid collisions with these objects. For example, as indicated by a hatched arrow, an action of allowing the aircraft to fall at a position in front of the house O1, the car O2, and the person O3 is planned, and autonomous avoidance is performed.

Figure 25:
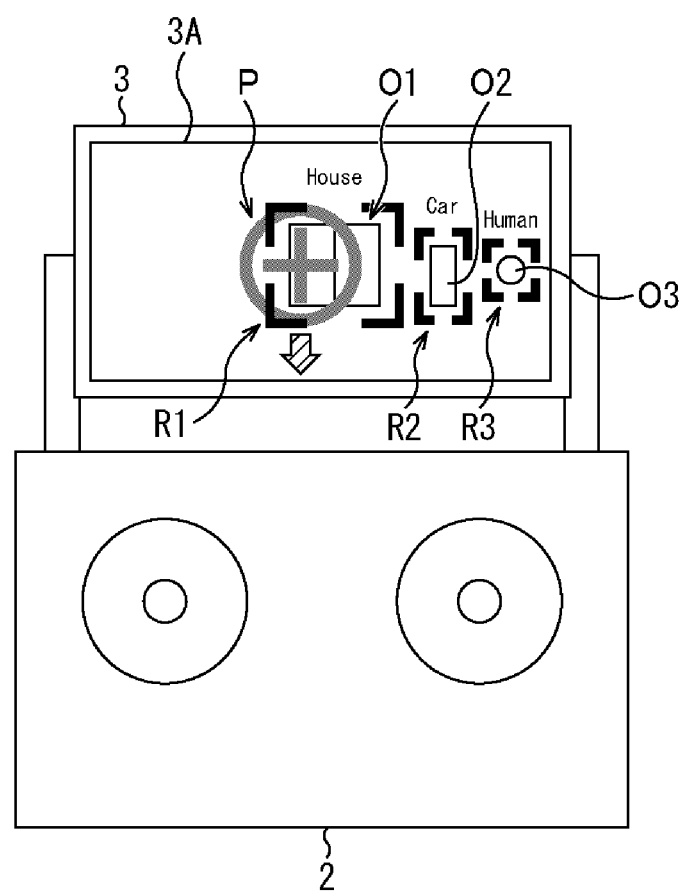
FIG. 25 is a diagram showing a display example of a composite image showing a direction of movement according to a plan.

FIG. 25 is a diagram showing a display example of a composite image showing the direction of movement according to the plan.

As shown in FIG. 25, an arrow indicating the direction of movement according to the plan is displayed in the composite image. The other display of the composite image shown in FIG. 25 is the same as the display of the composite image described with reference to FIG. 21.

Figure 26:
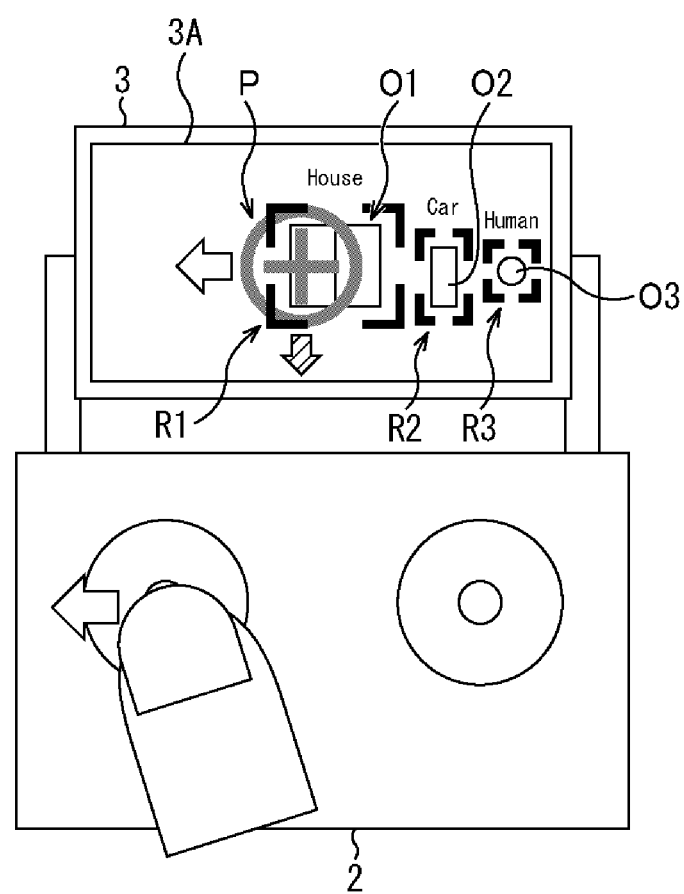
FIG. 26 is a diagram showing an example of a user's operation instructing to move in a direction different from the planned direction.

If the action planned by the unmanned aircraft 1 does not suit the user's values and situation, the user who have viewed the composite image may instruct to move in a direction different from the planned movement direction as shown in FIG. 26.

In the example of FIG. 26, the direction of autonomous avoidance is presented as the downward direction indicated by a hatched arrow, whereas the user instructs to move to the left. A control command representing the direction instructed by the user is transmitted to the unmanned aircraft 1.

Figure 27:
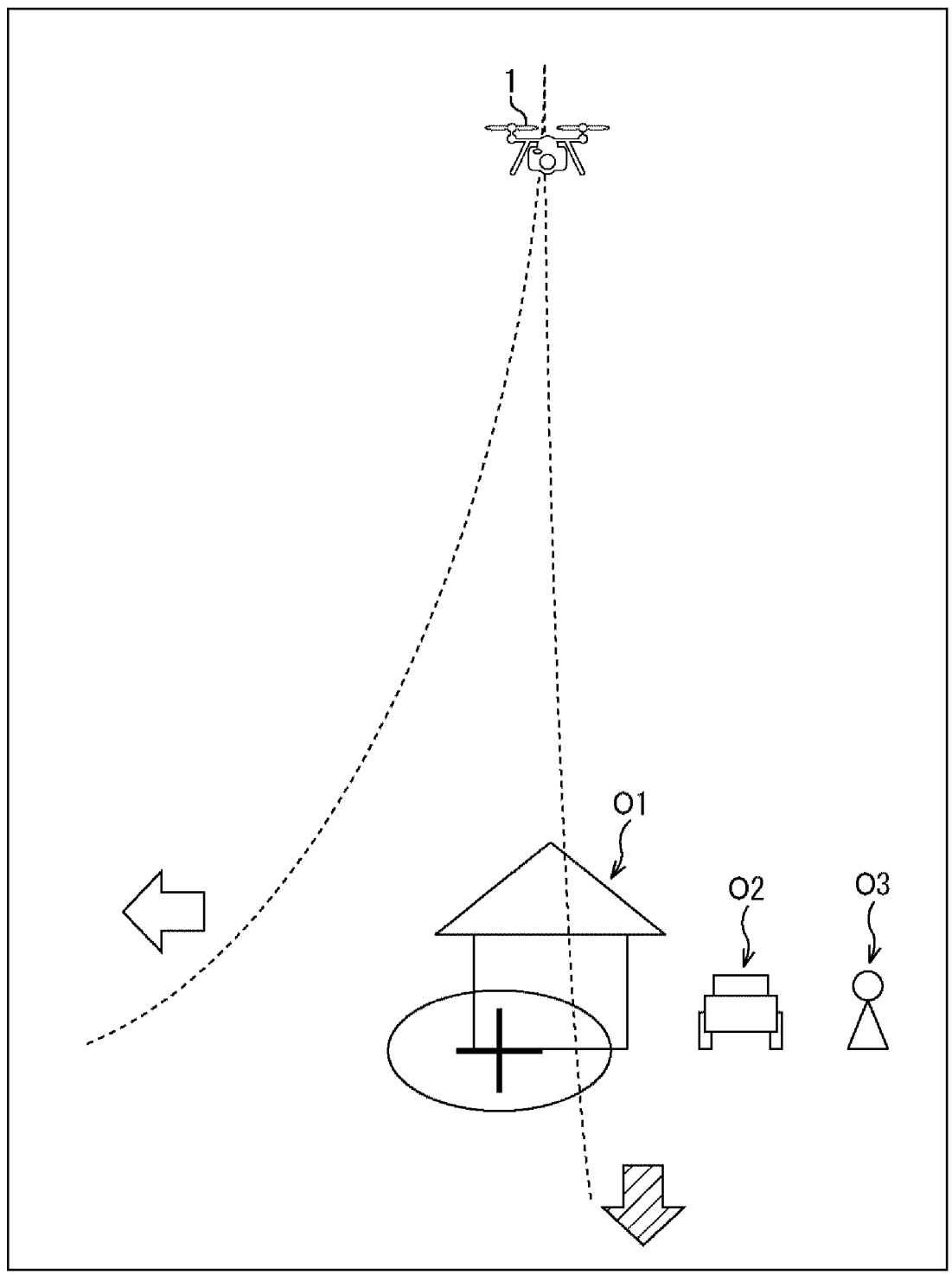
FIG. 27 is a diagram showing an example of movement of an unmanned aircraft.

FIG. 27 is a diagram showing an example of movement of the unmanned aircraft 1.

When a direction different from the direction of autonomous avoidance is designated by the user as described with reference to FIG. 26, the unmanned aircraft 1 prioritizes the user's instruction, as indicated by blank arrows in FIG. 27 and controls the aircraft so as to move in the direction instructed by the user.

In this way, the user may be able to intervene in the autonomous avoidance by the unmanned aircraft 1.

Instead of simply giving priority to the user's instructions, the direction of autonomous avoidance and the direction instructed by the user may be combined to plan a new action.

In order to make it easier for the user to determine the direction of movement, information representing the direction in which the unmanned aircraft 1 can be easily moved may be displayed. For example, the wind direction and the air volume are displayed as information representing the direction in which the unmanned aircraft 1 can be easily moved.

The time until the unmanned aircraft 1 falls may be displayed.

Figure 28:
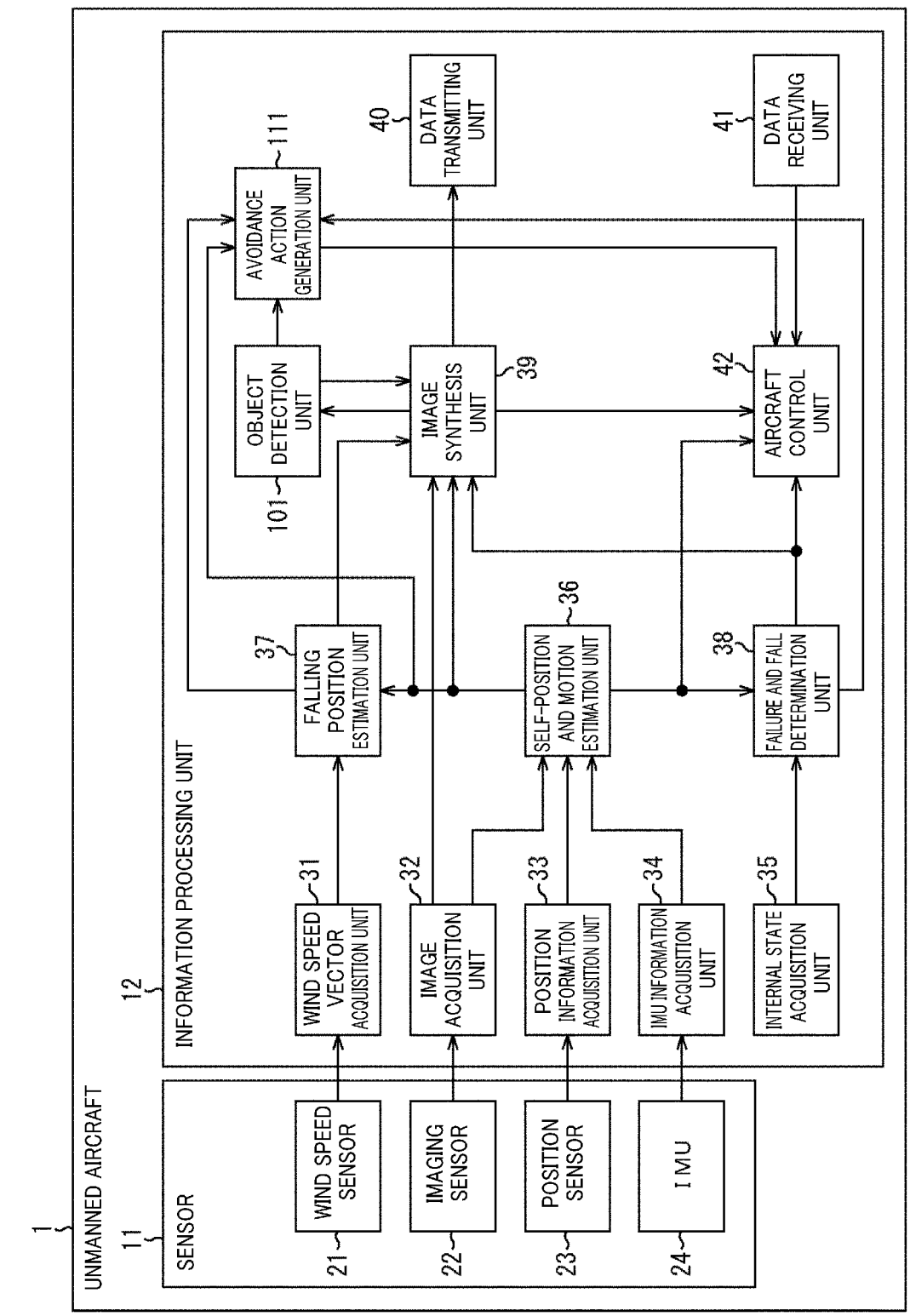
FIG. 28 is a block diagram showing a configuration example of an unmanned aircraft having an autonomous avoidance function.

FIG. 28 is a block diagram showing a configuration example of the unmanned aircraft 1 having an autonomous avoidance function.

The configuration of the unmanned aircraft 1 shown in FIG. 28 is the same as the configuration described with reference to FIG. 22 except that an avoidance action generation unit 111 is provided. Duplicate explanation will be omitted as appropriate.

The aircraft control unit 42 controls the aircraft of the unmanned aircraft 1 according to an action plan for autonomous avoidance supplied from the avoidance action generation unit 111. When a control command representing a user's instruction is received, the aircraft control unit 42 controls the aircraft of the unmanned aircraft 1 with priority given to the user's operation, as described above.

The object detection unit 101 calculates a three-dimensional position of the detected object in the image in which the falling position is captured. Distance information to the ground and distance information to an object are appropriately used for calculating the three-dimensional position. The object detection unit 101 outputs the information representing the three-dimensional position of the object and the object detection result to the avoidance action generation unit 111.

The self-position and motion estimation result is supplied to the avoidance action generation unit 111 from the self-position and motion estimation unit 36. Further, the avoidance action generation unit 111 is supplied with the falling position estimation result from the falling position estimation unit 37, and the failure and fall determination information from the failure and fall determination unit 38.

The avoidance action generation unit 111 plans actions necessary for avoiding a collision with an object shown in the composite image on the basis of the information supplied from each unit. Information representing the action planned by the avoidance action generation unit 111 is supplied to the aircraft control unit 42.

When the moving object is shown in the composite image, the position of the moving object at the time when the unmanned aircraft 1 collides with the ground or the object may be predicted by the avoidance action generation unit 111. In this case, the action is planned using the predicted position of the moving object.

Figure 29:
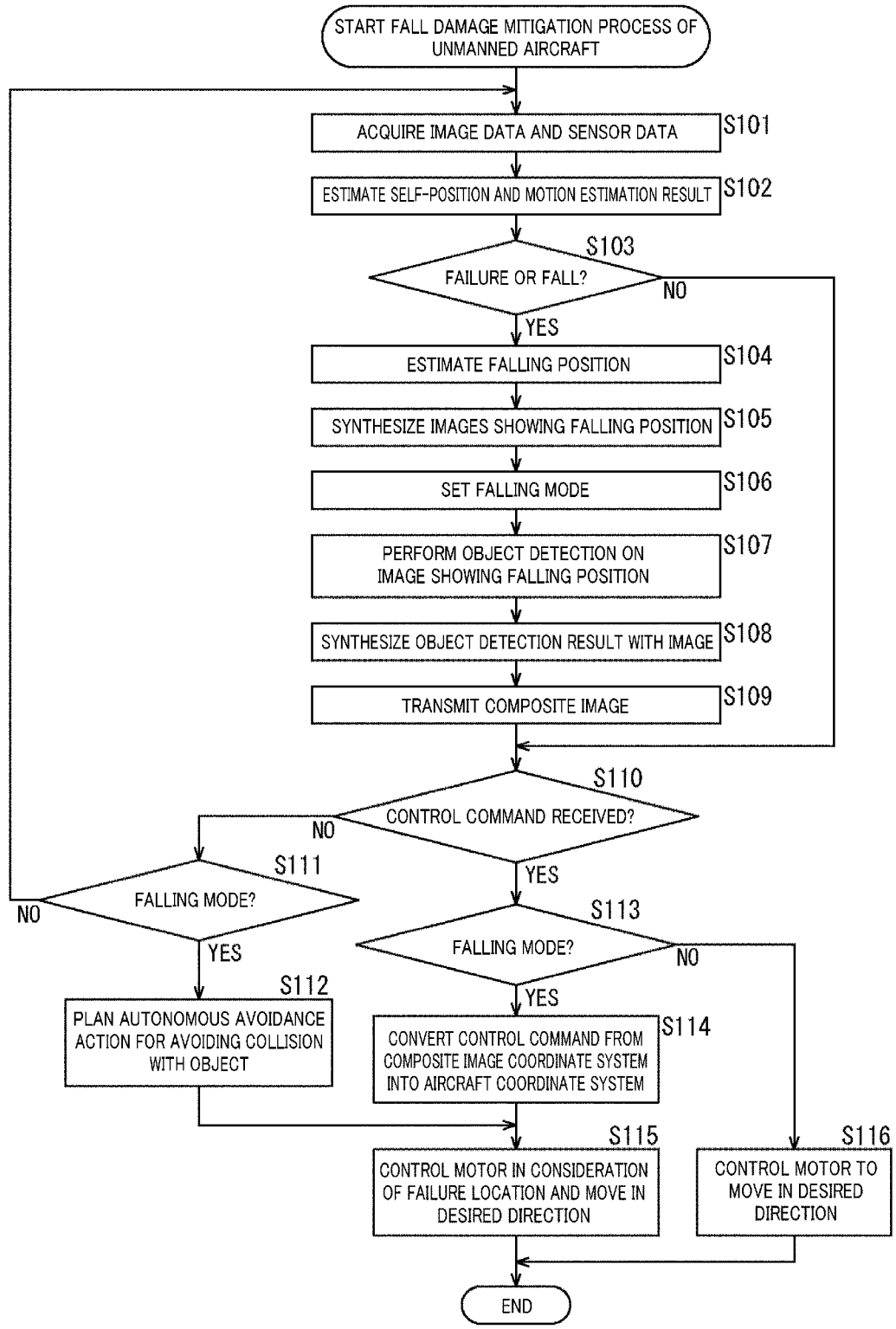
FIG. 29 is a flowchart illustrating a fall damage mitigation process performed by an unmanned aircraft.

Here, with reference to the flowchart of FIG. 29, the fall damage mitigation process performed by the unmanned aircraft 1 having the above-described configuration will be described.

Figure 23:
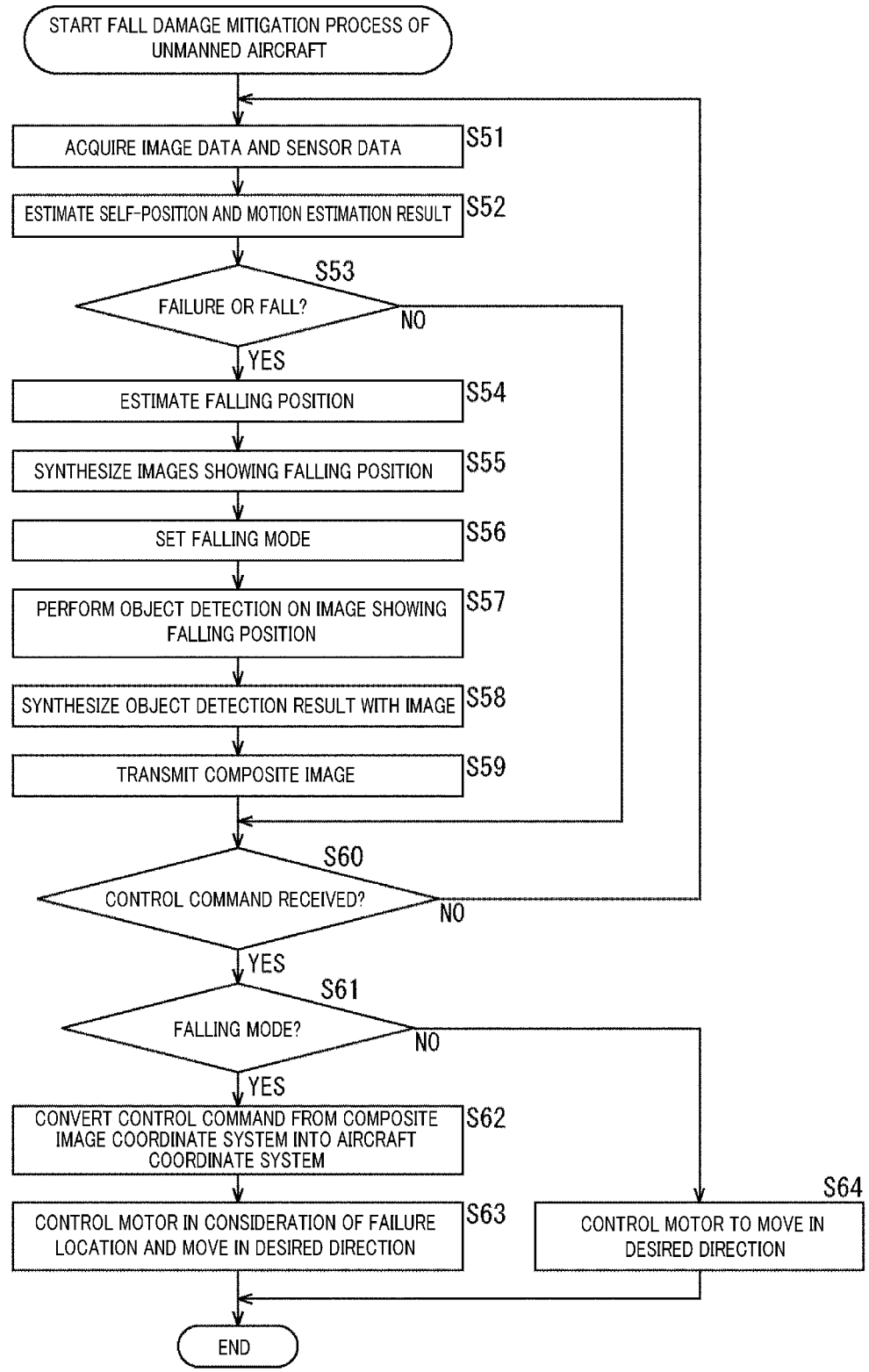
FIG. 23 is a flowchart illustrating a fall damage mitigation process performed by an unmanned aircraft.

The processes of steps S101 to S109 are the same as the processes of steps S51 to S59 of FIG. 23, respectively. That is, the operation mode of the unmanned aircraft 1 is set to the falling mode, and the composite image is transmitted to the controller 2.

In step S110, the data receiving unit 41 determines whether the control command has been received from the controller 2.

If it is determined in step S110 that the control command has not been received, the process proceeds to step S111.

In step S111, the aircraft control unit 42 determines whether the operation mode is the falling mode.

If it is determined in step S111 that the operation mode is not the falling mode, the process returns to step S101, and subsequent processes are performed.

On the other hand, if it is determined in step S111 that the operation mode is the falling mode, the process proceeds to step S112.

In step S112, the avoidance action generation unit 111 plans an action for autonomous avoidance. After the action for autonomous avoidance is planned, in step S115, the direction of movement of the unmanned aircraft 1 is controlled according to the planned action.

On the other hand, if it is determined in step S110 that the control command has been received, the process proceeds to step S113.

The processes of steps S113 to S116 are the same as the processes of steps S61 to S64 of FIG. 23, respectively. That is, it is determined whether the operation mode is the falling mode, and the movement of the unmanned aircraft 1 is controlled according to the operation by the user according to the determination result.

As described above, the unmanned aircraft 1 can autonomously take an action of avoiding a collision with an object shown in the composite image.

Modification

System Configuration

Although the sensor 11 and the information processing unit 12 are provided in the unmanned aircraft 1 (FIG. 7), some functions of the information processing unit 12 may be realized in any device of the controller 2 or the smartphone 3.

Figure 30:
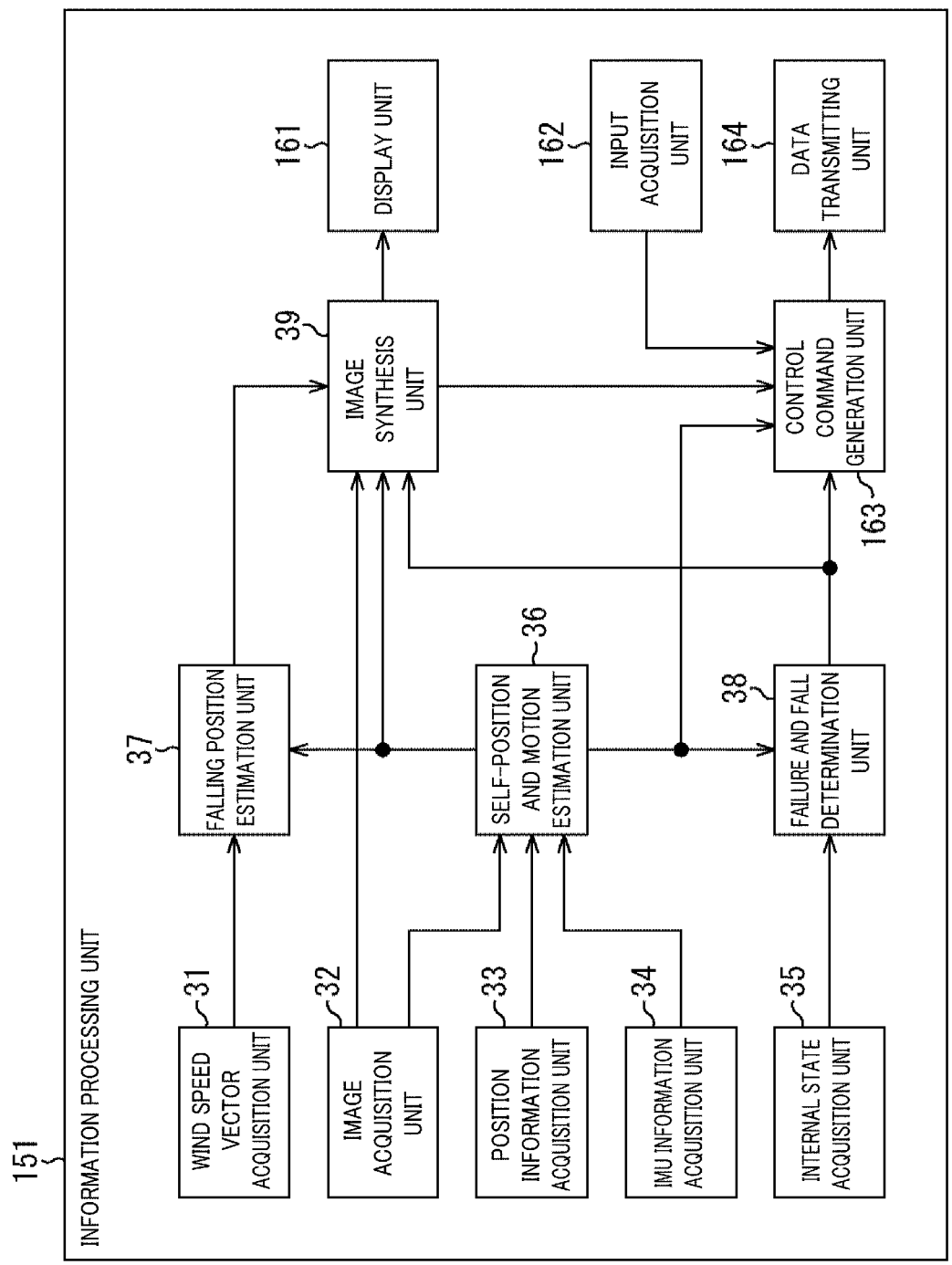
FIG. 30 is a diagram showing a configuration example of a smartphone.

FIG. 30 is a diagram showing a configuration example of the smartphone 3.

As shown in FIG. 30, the information processing unit 151 is realized in the smartphone 3. The configuration of the information processing unit 151 shown in FIG. 30 is the same as that of the information processing unit 12 of the unmanned aircraft 1 described with reference to FIG. 7, except that a display unit 161, an input acquisition unit 162, a control command generation unit 163, and a data transmitting unit 164 are provided. Duplicate explanation will be omitted as appropriate.

The information processing unit 151 acquires sensor data including captured images and the internal state from the sensor 11 provided in the unmanned aircraft 1 and various devices.

The display unit 161 causes the display 3A to display the composite image supplied from the image synthesis unit 39.

The input acquisition unit 162 outputs instruction information representing the content of the user's operation performed on the display 3A having a touch panel to the control command generation unit 163.

The control command generation unit 163 is supplied with the self-position and motion estimation result from the self-position and motion estimation unit 36, and the failure and fall determination information from the failure and fall determination unit 38. Further, a composite image is supplied from the image synthesis unit 39 to the control command generation unit 163.

The control command generation unit 163 determines whether there is a failure on the basis of the failure and fall determination information, and sets the operation mode of the smartphone 3. If a failure has occurred in the unmanned aircraft 1, the operation mode is set to the falling mode, and if no failure has occurred, the operation mode is set to the in-flight mode.

The control command generation unit 163 generates a control command representing the direction instructed by the user according to the instruction information supplied from the input acquisition unit 162. When the operation mode is the in-flight mode, the instruction information supplied from the input acquisition unit 162 is used as it is.

On the other hand, when the operation mode is the falling mode, the control command generation unit 163 converts the instruction information on the composite image coordinate system supplied from the input acquisition unit 162 into the aircraft coordinate system on the basis of the composite image to generate a control command.

The control command generation unit 163 outputs the self-position and motion estimation result, the failure and fall determination information, and the control command to the data transmitting unit 164.

The data transmitting unit 164 transmits the self-position and motion estimation result, the failure and fall determination information, and the control command supplied from the control command generation unit 163 to the unmanned aircraft 1.

As described above, a part of the configuration of the unmanned aircraft 1 shown in FIG. 7 may be provided on the smartphone 3.

Example of Computer

The series of processes described above can be executed by hardware or software. When a series of processes are executed by software, the programs constituting the software are installed from a program recording medium on a computer embedded in dedicated hardware, a general-purpose personal computer, or the like.

Figure 31:
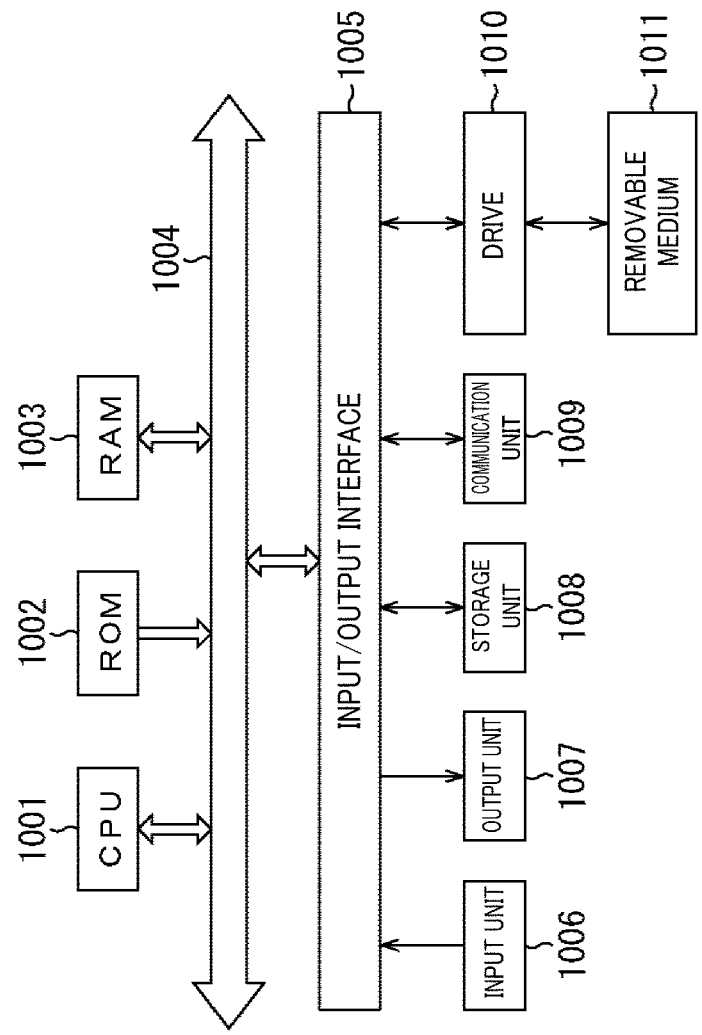
FIG. 31 is a block diagram showing a configuration example of computer hardware.

FIG. 31 is a block diagram illustrating a configuration example of hardware of a computer that executes a program to perform the above-described series of processing.

A central processing unit (CPU) 1001, a read-only memory (ROM) 1O2, and a random access memory (RAM) 1003 are connected to each other via a bus 1004.

An input/output interface 1005 is further connected to the bus 1004. An input unit 1006 including a keyboard and a mouse and an output unit 1007 including a display and a speaker are connected to the input/output interface 1005. A storage unit 1008 including a hard disk or a nonvolatile memory, a communication unit 1009 including a network interface, a drive 1010 driving a removable medium 1011 are connected to the input/output interface 1005.

In the computer that has such a configuration, for example, the CPU 1001 loads a program stored in the storage unit 1008 to the RAM 1003 via the input/output interface 1005 and the bus 1004 and executes the program to perform the above-described series of processing.

The program executed by the CPU 1001 is recorded on, for example, the removable medium 1011 or is provided via a wired or wireless transfer medium such as a local area network, the Internet, a digital broadcast to be installed in the storage unit 1008.

The program executed by the computer may be a program that performs processes chronologically in the procedure described in the present specification or may be a program that performs a process at a necessary timing such as in parallel or upon being called.

In the present specification, a system is a collection of a plurality of constituent elements (devices, modules (components), or the like) and all the constituent elements may be located or not located in the same casing. Therefore, a plurality of devices housed in separate housings and connected via a network, and one device in which a plurality of modules are housed in one housing are both systems.

Also, the advantageous effects described in the present specification are merely exemplary and are not intended as limiting, and other advantageous effects may be obtained.

The embodiment of the present technology is not limited to the above-described embodiments, and various modifications can be made without departing from the gist of the present technology.

For example, the present technology can be configured as cloud computing in which one function is shared and processed in common by a plurality of devices via a network.

Further, the respective steps described in the above-described flowchart can be executed by one device or in a shared manner by a plurality of devices.

Furthermore, in a case where a plurality of kinds of processing are included in a single step, the plurality of kinds of processing included in the single step may be executed by one device or by a plurality of devices in a shared manner.

<Combination Examples of Configurations>

The present technology can be configured as follows.

(1) A control device including: a control unit that controls movement of an unmanned aircraft during a fall according to a control command generated for an image showing a falling position, captured by the unmanned aircraft.

(2) The control device according to (1), further including: a synthesis unit that synthesizes information representing the falling position with an image captured by an imaging device provided on the unmanned aircraft and generates a composite image used for operation by a user.

(3) The control device according to (2), further including: an estimation unit that estimates a flight state of the unmanned aircraft on the basis of sensor data output by a sensor provided on the unmanned aircraft; and a falling position estimation unit that estimates the falling position on the basis of the flight state and external force applied to the unmanned aircraft.

(4) The control device according to (3), further including: a determination unit that detecting a fall of the unmanned aircraft on the basis of at least one of the flight state and an internal state of the unmanned aircraft.

(5) The control device according to (3) or (4), wherein the synthesis unit generates the composite image by projecting and converting an image captured by the imaging device with respect to a plane representing the ground on the basis of the flight state and parameters of the imaging device and synthesizing information representing the falling position with an image obtained by the projection and conversion.

(6) The control device according to any one of (2) to (5), wherein the synthesis unit generates the composite image including information representing the falling position and information representing a position directly below the unmanned aircraft.

(7) The control device according to any one of (1) to (6), wherein the control unit controls the movement of the unmanned aircraft according to a direction or position on an image designated by a user.

(8) The control device according to (7), wherein the control unit converts the direction designated by the user into a direction on a coordinate system of the unmanned aircraft and controls the movement of the unmanned aircraft.

(9) The control device according to (7), wherein the control unit controls the movement of the unmanned aircraft on the basis of a difference between the position designated by the user and the falling position.

(10) The control device according to any one of (2) to (9), further including: a detection unit that detects an object appearing in an image captured by the imaging device, wherein the synthesis unit synthesizes object information representing the object detected by the detection unit with the composite image.

(11) The control device according to (10), further including: an action planning unit that plans an action of the unmanned aircraft for avoiding contact with the object detected by the detection unit, wherein the control unit controls the movement of the unmanned aircraft on the basis of the planned action and the operation by the user.

(12) The control device according to (11), wherein the control unit gives priority to the operation by the user to control the movement of the unmanned aircraft.

(13) A control method including: allowing a control device to control movement of an unmanned aircraft during a fall according to a control command generated for an image showing a falling position, captured by the unmanned aircraft.

(14) A program for causing a computer to execute: controlling movement of an unmanned aircraft during a fall according to a control command generated for an image showing a falling position, captured by the unmanned aircraft.

(15) An unmanned aircraft including: an imaging unit that captures a surrounding situation; and a control unit that controls movement of an unmanned aircraft during a fall according to a control command generated for an image showing a falling position, captured by the imaging unit.

(16) An information processing device including: a display control unit that displays an image showing a falling position, captured by an unmanned aircraft; a generation unit that generates a control command used for controlling the movement of the unmanned aircraft with respect to the image; and a transmitting unit that transmits the control command to the unmanned aircraft.

(17) An information processing method for allowing an information processing device to execute: displaying an image showing a falling position, captured by an unmanned aircraft; generating a control command used for controlling the movement of the unmanned aircraft with respect to the image; and transmitting the control command to the unmanned aircraft.

(18) A program for causing a computer to execute: displaying an image showing a falling position, captured by an unmanned aircraft; generating a control command used for controlling the movement of the unmanned aircraft with respect to the image; and transmitting the control command to the unmanned aircraft.

REFERENCE SIGNS LIST

1 Unmanned aircraft
2 Controller
3 Smartphone
11 Sensor
12 Information processing unit
31 Wind speed vector acquisition unit
32 Image acquisition unit
33 Location information acquisition unit
34 IMU information acquisition unit
35 Internal information acquisition unit
36 Self-position and motion estimation unit
37 Falling position estimation unit
38 Failure and fall determination unit
39 Image synthesis unit
40 Data transmitting unit
41 Data receiving unit
42 Aircraft control unit
101 Object detection unit
111 Avoidance action generation unit
151 Information processing unit
161 Display unit
162 Input acquisition unit
163 Control command generation unit
164 Data transmission unit

The invention claimed is:

1. A control device, comprising:
a central processing unit (CPU) configured to:
   acquire image data captured by an unmanned aircraft, wherein the image data includes:
      a first image acquired at a first time, and
      a second image acquired at a second time;
   determine, based on the acquired image data, information that represents a falling position of the unmanned aircraft;
   generate, based on the image data captured and the determined information representing the falling position, a composite image for user operation, wherein
      a display range of the composite image includes the falling position at a center,
      the composite image is generated based on the first image, at the first time,
      an angle of view with which the first image is captured, completely overlaps with the display range of the composite image, and
      the composite image is generated based on each of a part of the second image and a part of the first image, at the second time;
   receive a control command that represents content of the user operation on the composite image, wherein the content of the user operation corresponds to one of a direction or a position designated by a user on a coordinate system of the composite image;
   convert one of the direction or the position designated by the user from the coordinate system of the composite image to a coordinate system of the unmanned aircraft; and
   control, based on one of the converted direction or position, movement of the unmanned aircraft during a fall.

2. The control device according to claim 1, wherein the CPU is further configured to:
   estimate a flight state of the unmanned aircraft based on sensor data output by a sensor on the unmanned aircraft; and
   estimate the falling position based on the flight state and external force on the unmanned aircraft.

3. The control device according to claim 2, wherein the CPU is further configured to:
   detect a fall of the unmanned aircraft based on at least one of the flight state and an internal state of the unmanned aircraft.

4. The control device according to claim 2, wherein the CPU is further configured to:
project and convert, based on the flight state and parameters of an imaging device on the unmanned aircraft, the image data captured by the imaging device with respect to a plane representing a ground;
determine the information representing the falling position based on the projected and converted image data; and
generate the composite image based on the determined information representing the falling position.

5. The control device according to claim 4, wherein the CPU is further configured to:
generate the composite image including the determined information representing the falling position and information representing a position directly below the unmanned aircraft.

6. The control device according to claim 1, wherein the CPU is further configured to control the movement of the unmanned aircraft based on a difference between the position designated by the user and the falling position.

7. The control device according to claim 1, wherein the CPU is further configured to:
detect an object in the image data captured by an imaging device of the unmanned aircraft;
synthesize object information representing the detected object; and
generate the composite image that includes the object information.

8. The control device according to claim 7, wherein the CPU is further configured to:
plan an action of the unmanned aircraft for contact avoidance with the detected object; and
control the movement of the unmanned aircraft based on the planned action and the user operation.

9. The control device according to claim 8, wherein the CPU is further configured to prioritize the user operation to control the movement of the unmanned aircraft.

10. A control method, comprising:
acquiring image data captured by an unmanned aircraft, wherein the image data includes:
a first image acquired at a first time, and
a second image acquired at a second time;
determining, based on the acquired image data, information that represents a falling position of the unmanned aircraft;
generating, based on the image data and the determined information representing the falling position, a composite image for user operation, wherein
a display range of the composite image includes the falling position at a center,
the composite image is generated based on the first image, at the first time,
an angle of view with which the first image is captured, completely overlaps with the display range of the composite image, and
the composite image is generated based on each of a part of the second image and a part of the first image, at the second time;
receiving a control command that represents content of the user operation on the composite image, wherein
the content of the user operation corresponds to one of a direction or a position designated by a user on a coordinate system of the composite image;
converting one of the direction or the position designated by the user from the coordinate system of the composite image to a coordinate system of the unmanned aircraft; and
controlling, based on one of the converted direction or position, movement of the unmanned aircraft during a fall.

11. A non-transitory computer-readable medium having stored thereon, computer-executable instructions which, when executed by a computer, cause the computer to execute operations, the operations comprising:
acquiring image data captured by an unmanned aircraft, wherein the image data includes:
a first image acquired at a first time, and
a second image acquired at a second time
determining, based on the acquired image data, information that represents a falling position of the unmanned aircraft;
generating, based on the image data and the determined information representing the falling position, a composite image for user operation, wherein
a display range of the composite image includes the falling position at a center,
the composite image is generated based on the first image, at the first time,
an angle of view with which the first image is captured, completely overlaps with the display range of the composite image, and
the composite image is generated based on each of a part of the second image and a part of the first image, at the second time;
receiving a control command that represents content of the user operation on the composite image, wherein
the content of the user operation corresponds to one of a direction or a position designated by a user on a coordinate system of the composite image;
converting one of the direction or the position designated by the user from the coordinate system of the composite image to a coordinate system of the unmanned aircraft; and
controlling, based on one of the converted direction or position, movement of the unmanned aircraft during a fall.

12. An unmanned aircraft, comprising:
an imaging unit configured to capture image data of a surrounding situation, wherein the image data includes
a first image captured at a first time, and
a second image captured at a second time; and
a central processing unit (CPU) configured to:
determine, based on the captured image data, information that represents a falling position of the unmanned aircraft;
generate, based on the captured image data and the determined information representing the falling position, a composite image for user operation, wherein
a display range of the composite image includes the falling position at a center,
the composite image is generated based on the first image, at the first time,
an angle of view with which the first image is captured, completely overlaps with the display range of the composite image, and
the composite image is generated based on each of a part of the second image and a part of the first image, at the second time;
receive a control command that represents content of the user operation on the composite image, wherein the content of the user operation corresponds to one of a direction or a position designated by a user on a coordinate system of the composite image;
convert one of the direction or the position designated by the user from the coordinate system of the composite image to a coordinate system of the unmanned aircraft; and
control unit configured to control, based on one of the converted direction or position, movement of the unmanned aircraft during a fall.

13. An information processing device, comprising:
a display control unit configured to display a composite image for user operation, wherein
the composite image is based on an image data captured by an unmanned aircraft,
the image data includes:
a first image acquired at a first time, and
a second image acquired at a second time,
the composite image indicates a falling position of the unmanned aircraft,
a display range of the composite image includes the falling position at a center,
the composite image is generated based on the first image, at the first time,
an angle of view with which the first image is captured, completely overlaps with the display range of the composite image, and
the composite image is generated based on each of a part of the second image and a part of the first image, at the second time;
a generation unit configured to generate a control command to control movement of the unmanned aircraft with respect to the composite image, wherein
the control command is based on the user operation on the displayed composite image,
the control command includes content that represents one of a direction or a position designated by a user on a coordinate system of the composite image, and
the coordinate system of the composite image is different from a coordinate system of the unmanned aircraft; and
a transmitting unit configured to transmit the control command to the unmanned aircraft.

14. An information processing method, comprising:
displaying a composite image for user operation, wherein
the composite image is based on an image data captured by an unmanned aircraft,
the image data includes:
a first image acquired at a first time, and
a second image acquired at a second time,
the composite image indicates a falling position of the unmanned aircraft,
a display range of the composite image includes the falling position at a center,
the composite image is generated based on the first image, at the first time,
an angle of view with which the first image is captured, completely overlaps with the display range of the composite image, and
the composite image is generated based on each of a part of the second image and a part of the first image, at the second time;
generating a control command to control movement of the unmanned aircraft with respect to the composite image, wherein
the control command is based on the user operation on the displayed composite image,
the control command includes content that represents one of a direction or a position designated by a user on a coordinate system of the composite image, and
the coordinate system of the composite image is different from a coordinate system of the unmanned aircraft; and
transmitting the control command to the unmanned aircraft.

15. A non-transitory computer-readable medium having stored thereon, computer-executable instructions which, when executed by a computer, cause the computer to execute operations, the operations comprising:
displaying a composite image for user operation, wherein
the composite image is based on an image data captured by an unmanned aircraft,
the image data includes:
a first image acquired at a first time, and
a second image acquired at a second time,
the composite image indicates a falling position of the unmanned aircraft,
a display range of the composite image includes the falling position at a center,
the composite image is generated based on the first image, at the first time,
an angle of view with which the first image is captured, completely overlaps with the display range of the composite image, and
the composite image is generated based on each of a part of the second image and a part of the first image, at the second time;
generating a control command to control movement of the unmanned aircraft with respect to the composite image, wherein
the control command is based on the user operation on the displayed composite image,
the control command includes content that represents one of a direction or a position designated by a user on a coordinate system of the composite image, and
the coordinate system of the composite image is different from a coordinate system of the unmanned aircraft; and
transmitting the control command to the unmanned aircraft.

* * * * *